(12) United States Patent
Hattori et al.

(10) Patent No.: US 7,893,648 B2
(45) Date of Patent: Feb. 22, 2011

(54) STEPPING MOTOR DRIVING DEVICE, SHEET PROCESSING DEVICE, AND IMAGE PROCESSING APPARATUS

(75) Inventors: Hitoshi Hattori, Tokyo (JP); Masahiro Tamura, Kanagawa (JP); Nobuyoshi Suzuki, Tokyo (JP); Shuuya Nagasako, Kanagawa (JP); Tomoichi Nomura, Nagoya (JP); Hiroshi Maeda, Nagoya (JP); Kazuhiro Kobayashi, Kanagwa (JP); Akira Kunieda, Tokyo (JP); Makoto Hidaka, Tokyo (JP); Ichiro Ichihashi, Nagoya (JP); Tomohiro Furuhashi, Kanagwa (JP); Naohiro Kikkawa, Kanagawa (JP); Junichi Tokita, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 399 days.

(21) Appl. No.: 12/153,675

(22) Filed: May 22, 2008

(65) Prior Publication Data

US 2008/0290830 A1 Nov. 27, 2008

(30) Foreign Application Priority Data

May 25, 2007 (JP) .............................. 2007-139301

(51) Int. Cl.
*G05B 19/40* (2006.01)
(52) U.S. Cl. ......................... 318/685; 318/696; 363/26; 363/41; 358/434; 358/437
(58) Field of Classification Search ................ 318/685, 318/696; 363/26, 41; 358/434, 437
See application file for complete search history.

(56) References Cited

U.S. PATENT DOCUMENTS

| | | | | |
|---|---|---|---|---|
| 3,812,414 A | * | 5/1974 | Abraham et al. | 318/696 |
| 4,158,800 A | * | 6/1979 | Jahelka et al. | 318/685 |
| 4,282,471 A | * | 8/1981 | Budniak et al. | 318/685 |
| 4,282,472 A | * | 8/1981 | Martin | 318/696 |
| 4,469,995 A | * | 9/1984 | Chiang et al. | 318/685 |
| 4,658,194 A | * | 4/1987 | Richter et al. | 318/696 |
| 4,816,937 A | * | 3/1989 | Fukushima | 360/73.03 |
| 5,416,395 A | * | 5/1995 | Hiramatsu et al. | 318/600 |
| 5,844,394 A | * | 12/1998 | Mushika et al. | 318/696 |
| 6,679,172 B2 | * | 1/2004 | Tokiwa | 101/484 |
| 7,328,892 B2 | | 2/2008 | Asami et al. | |
| 2006/0261544 A1 | | 11/2006 | Tamura et al. | |
| 2007/0182082 A1 | | 8/2007 | Asami et al. | |
| 2007/0235917 A1 | | 10/2007 | Nagasako et al. | |
| 2008/0006993 A1 | | 1/2008 | Nomura et al. | |

(Continued)

FOREIGN PATENT DOCUMENTS

JP 06-169379 6/1994

(Continued)

*Primary Examiner*—Rita Leykin
(74) *Attorney, Agent, or Firm*—Harness, Dickey & Pierce, P.L.C.

(57) ABSTRACT

A stepping motor driving device drives a stepping motor according to a drive pulse of a step signal. A phase matching unit matches, at a time when there is a possibility that a rotor and a phase signal are out of phase with each other, phases of the rotor and the phase signal by applying at least one drive pulse after energizing the stepping motor for a predetermined time and applying a phase signal having a predetermined duration for a final pulse.

13 Claims, 34 Drawing Sheets

U.S. PATENT DOCUMENTS

| | | |
|---|---|---|
| 2008/0048380 A1 | 2/2008 | Ichihashi et al. |
| 2008/0067730 A1 | 3/2008 | Suzuki et al. |

FOREIGN PATENT DOCUMENTS

| | | |
|---|---|---|
| JP | 10-148237 | 6/1998 |
| JP | 2001-292597 | 10/2001 |
| JP | 2001-346399 | 12/2001 |
| JP | 2003-180097 | 6/2003 |
| JP | 2003-299394 | 10/2003 |

* cited by examiner

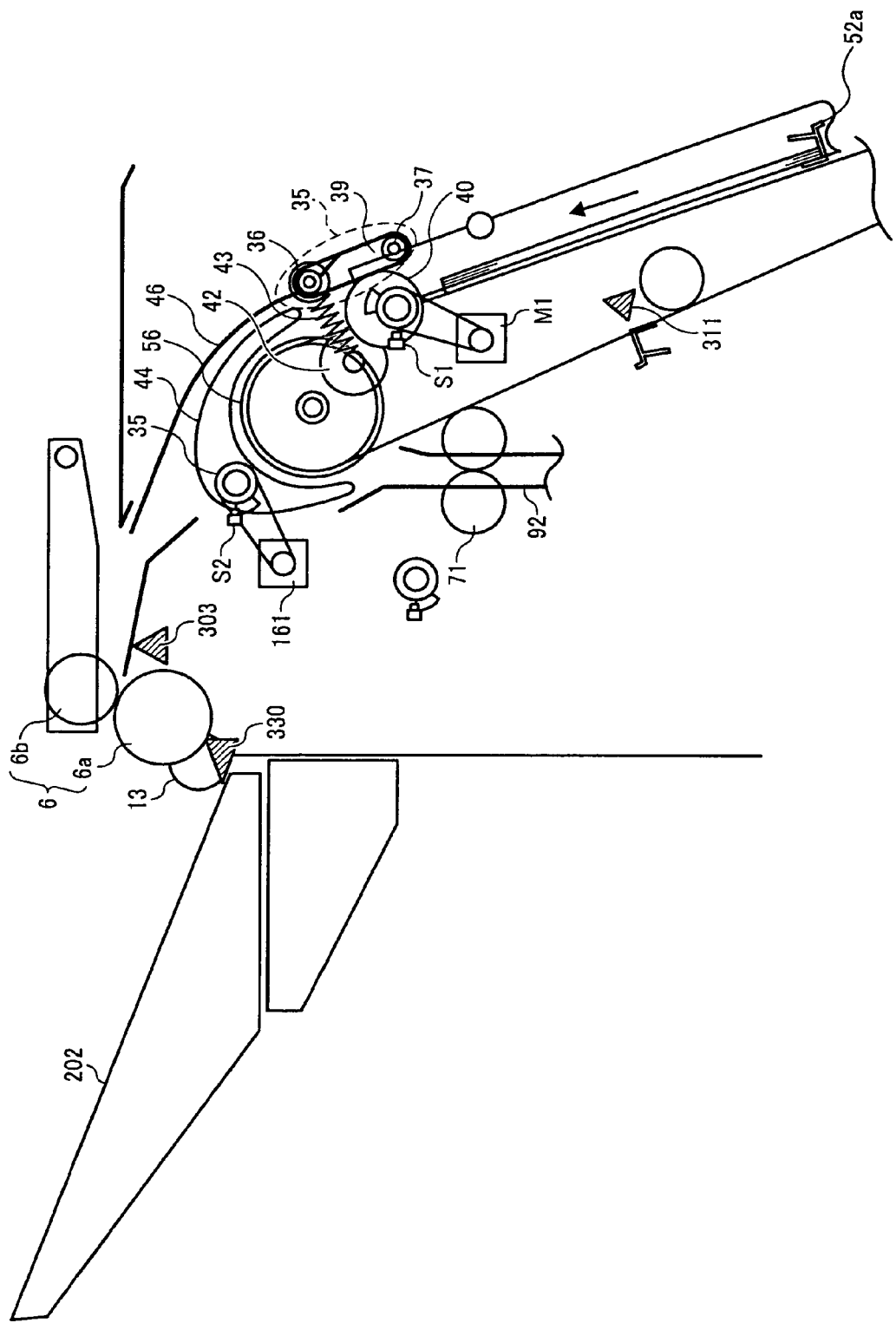

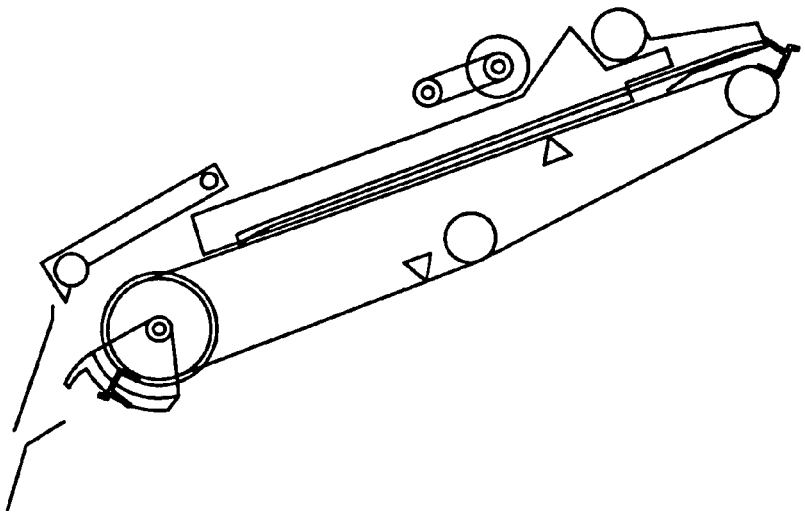
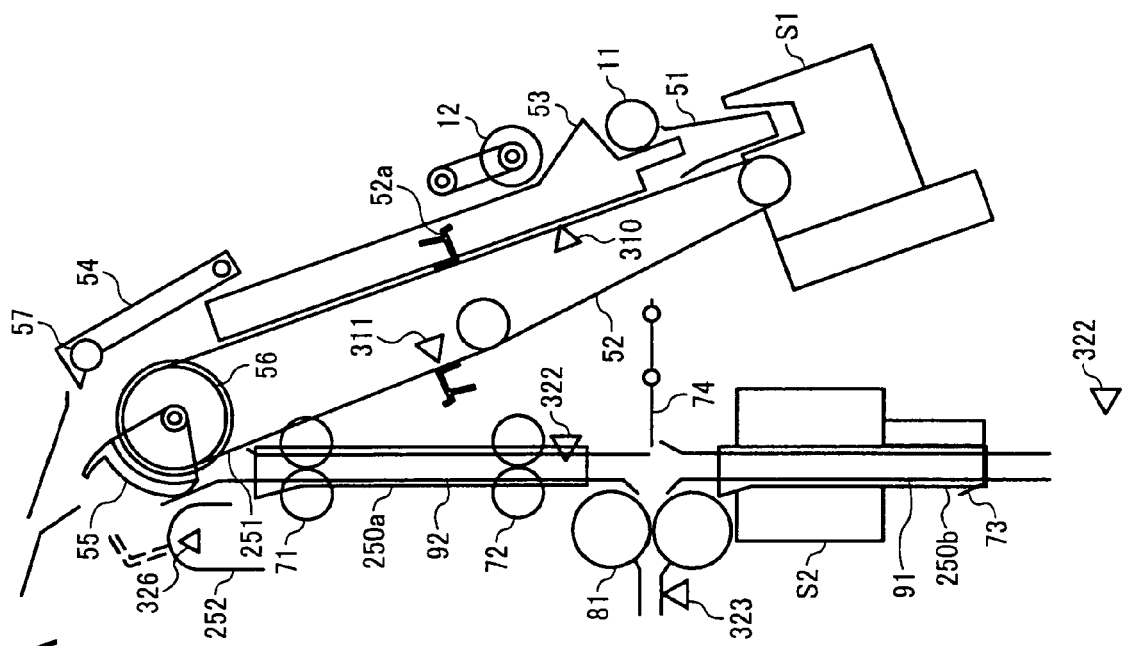

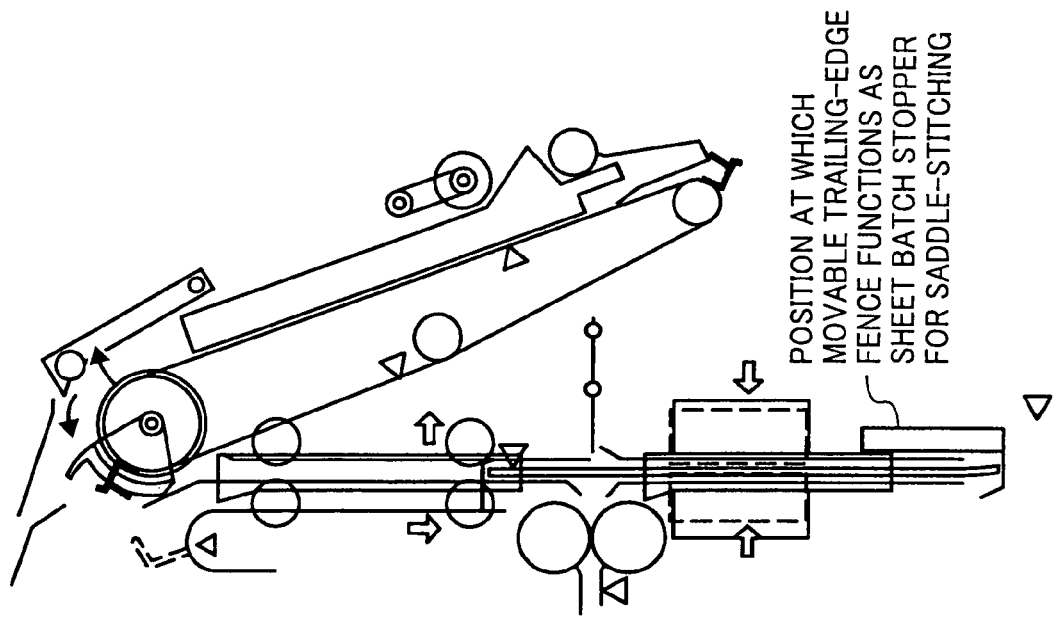
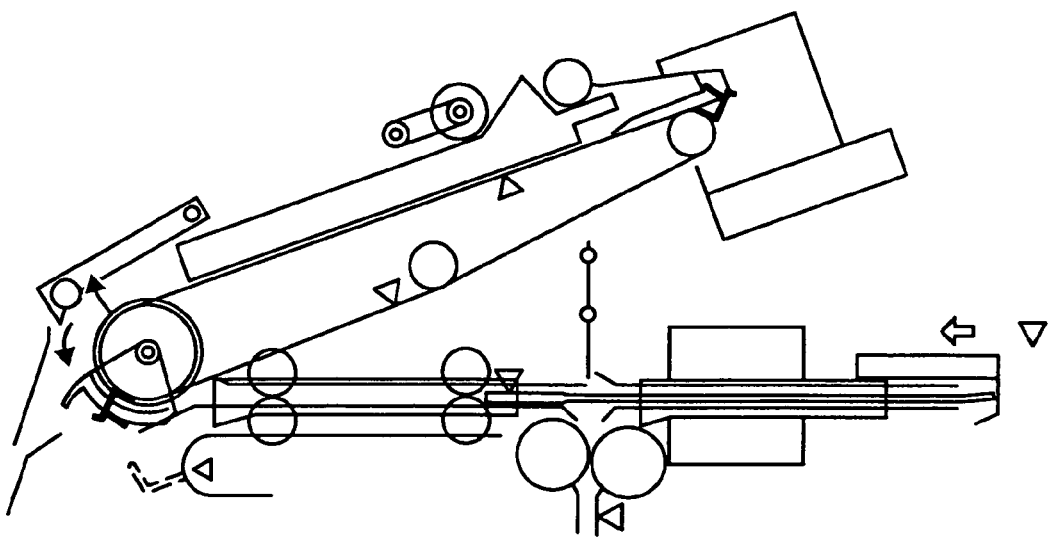

POSITION AT WHICH MOVABLE TRAILING-EDGE FENCE FUNCTIONS AS SHEET BATCH STOPPER FOR CENTER FOLDING

STEPPING MOTOR DRIVING DEVICE, SHEET PROCESSING DEVICE, AND IMAGE PROCESSING APPARATUS

CROSS-REFERENCE TO RELATED APPLICATIONS

The present application claims priority to and incorporates by reference the entire contents of Japanese priority document 2007-139301 filed in Japan on May 25, 2007.

BACKGROUND OF THE INVENTION

1. Field of the Invention

The present invention relates to a technology for driving a stepping motor for a sheet processing device or the like.

2. Description of the Related Art

To drive a stepping motor, it is required to cause a phase of the motor to match with that of a phase signal, in other words, to perform a so-called "phase matching operation", to prevent being out of phase. Conventionally, several phase matching methods have been proposed.

A method of energizing a stepping motor for a predetermined time at power-on of the motor has been proposed (see, for example, Japanese Patent Application Laid-Open No. 2001-292597). According to this method, the motor is energized again for a predetermined time when there is a possibility of being out of phase.

Another method of driving a stepping motor for drive pulses and for at least a first pulse after the motor is de-energized has been proposed (for example, see Japanese Patent Application Laid-Open No. 2001-346399). The at least first pulse drives the stepping motor to return to a position at which the motor is stopped before de-energization.

However, when a phase matching operation is performed immediately before the motor is started, a duration that elapses until the motor starts a main driving operation becomes longer. Consequently, the motor can fail to start driving in time when quick start-up is required of the motor. The phase matching operation referred to here means to drive a stepping motor by a small degree to thereby attain phase matching. In a broad sense, the phase matching operation is also a kind of a driving operation of the motor. Hence, in the following description, a driving operation a stepping motor performed for an intended purpose is referred to as "main driving operation" as in the above to distinguish the main driving operation from the phase matching operation.

Performing the phase matching operation at power-on or when a door is closed allows to spare the above-described inconvenience, however, there are some cases that phase matching cannot be attained only by energizing the motor for a predetermined time (a rotor remains to be out of phase and does not work).

SUMMARY OF THE INVENTION

It is an object of the present invention to at least partially solve the problems in the conventional technology.

According to an aspect of the present invention, there is provided a device for driving a stepping motor according to a drive pulse of a step signal, including a phase matching unit that matches, at a time when there is a possibility that a rotor and a phase signal are out of phase with each other, phases of the rotor and the phase signal by applying at least one drive pulse after energizing the stepping motor for a predetermined time and applying a phase signal having a predetermined duration for a final pulse.

Furthermore, according to another aspect of the present invention, there is provided a sheet processing device including a stepping motor driving device that drives a stepping motor according to a drive pulse of a step signal, the stepping motor driving device including a phase matching unit that matches, at a time when there is a possibility that a rotor and a phase signal are out of phase with each other, phases of the rotor and the phase signal by applying at least one drive pulse after energizing the stepping motor for a predetermined time and applying a phase signal having a predetermined duration for a final pulse.

Moreover, according to still another aspect of the present invention, there is provided an image processing apparatus including a sheet processing device that includes a stepping motor driving device that drives a stepping motor according to a drive pulse of a step signal. The stepping motor driving device includes a phase matching unit that matches, at a time when there is a possibility that a rotor and a phase signal are out of phase with each other, phases of the rotor and the phase signal by applying at least one drive pulse after energizing the stepping motor for a predetermined time and applying a phase signal having a predetermined duration for a final pulse.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 17 is a schematic diagram for explaining a state immediately before an aligned sheet bundle is transported out of the stapling unit;

FIGS. 22A to 22D are schematic diagrams for explaining a procedure from aligning a sheet bundle to sending out of the sheet bundle;

FIGS. 23A to 23C are schematic diagrams for explaining motions of a sheet bundle in a folding unit;

DETAILED DESCRIPTION OF THE PREFERRED EMBODIMENTS

Exemplary embodiments of the present invention are explained in detail below with reference to the accompanying drawings.

Figure 1:
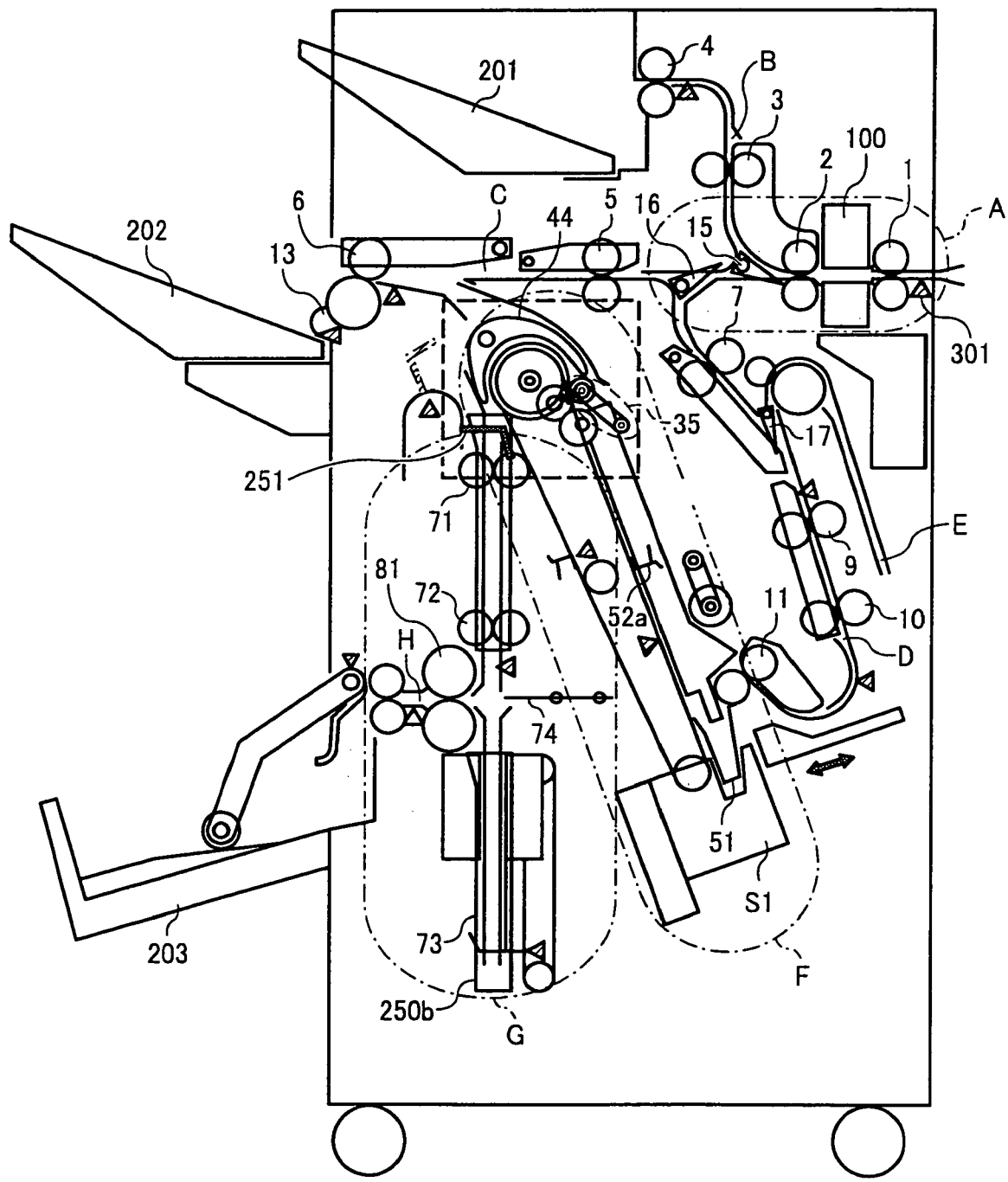
FIG. 1 is an overall configuration diagram of a sheet finisher according to an embodiment of the present invention.

FIG. 1 is an overall configuration diagram of a sheet finisher according to a configuration example of the present invention.

In FIG. 1, reference numeral 1 denotes inlet rollers, 2 denotes transport rollers, 9 and 10 each denotes transport rollers, 11 denotes exit-to-stapler rollers, 15, 16, and 17 each denotes a path-switching flap, 44 denotes a guide member, 100 denotes a punching unit, 201 denotes an upper tray, 202 denotes a shift tray, 203 denotes a lower tray, 301 denotes an inlet sensor, A, B, C, D, and H each denotes a sheet transport path, E denotes a sheet container, F denotes a stapling unit, and G denotes a folding unit. Other reference numerals will be described with reference to corresponding schematic diagrams.

In the following description, the sheet finisher is assumed to be attached to an image forming apparatus.

The sheet finisher is attached to a side portion of the image forming apparatus such that a sheet discharged from the image forming apparatus is guided to the sheet finisher. The sheet passes through the transport path A that has finishing means (in the embodiments described later, punching means is embodied as the punching unit 100) that performs post processing on a sheet. Subsequently, the sheet is selectively guided by the path-switching flaps 15 and 16 to one of the transport path B that guides the sheet to the upper tray 201, the transport path C that guides the sheet to the shift tray 202, and the transport path D that guides the sheet to the stapling unit F that performs aligning, stapling, and the like.

After being subjected to the aligning, stapling, and the like operation in the stapling unit F, the sheet is selectively guided by the guide member 44, which is direction-changing means, to any one of the transport path C that guides the sheet to the shift tray 202 and the folding unit G, in which the sheet is subjected to folding and the like operation. After being folded in the folding unit G, the sheet is guided to the lower tray 203 through the transport path H.

The path-switching flap 17 is provided on the transport path D and held by a low-load spring (not shown) as shown in FIG. 1. When a trailing edge of the sheet passes by the path-switching flap 17, rotating directions of at least one of the transport roller pairs 9 and 10 and the exit-to-stapler roller 11 are reversed to guide the trailing edge of the sheet to the sheet container E and retain the sheet therein. Hence, the sheet, on which a subsequent sheet is stacked, can be transported in a stack. By repeating this operation, two or more sheets can be transported in a stack.

The transport path A, which is a common upstream path to each of the transport paths B, C, and D, includes the inlet sensor 301, the inlet rollers 1, the punching unit 100, the transport rollers 2, and the path-switching flaps 15 and 16, which are arranged in this order along a sheet transport direction. The inlet sensor 301 detects a sheet when the sheet is supplied from the image forming apparatus. The path-switching flaps 15 and 16 are independently held by springs (not shown) as shown in FIG. 1. When solenoids (not shown) are energized, the path-switching flaps 15 and 16 pivot upward and downward, respectively, thereby selectively guiding the sheet into one of the transport paths B, C, and D.

To guide the sheet to the transport path B, the solenoids are de-energized with path-switching flap 15 held in the state shown in FIG. 1. To guide the sheet to the transport path C, the solenoids are energized in the state shown in FIG. 1, thereby causing the path-switching flaps 15 and 16 to pivot upward and downward, respectively. To guide the sheet to the transport path D, the solenoid for the path-switching flap 16 is de-energized in the state shown in FIG. 1, and the solenoid for the path-switching flap 15 is energized in the state shown in FIG. 1, thereby causing the path-switching flaps 15 and 16 to pivot upward.

Figure 2:
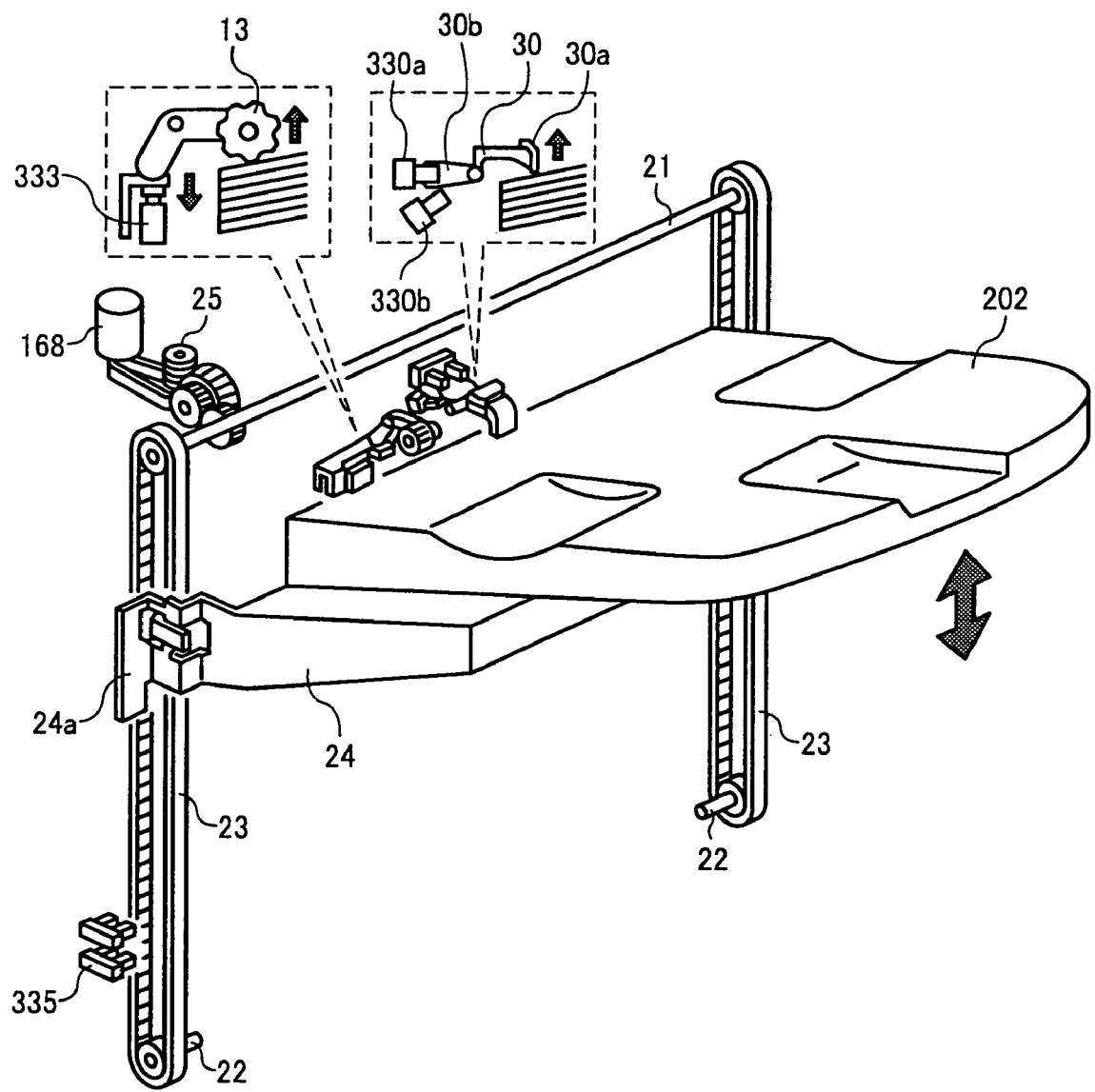
FIG. 2 is a schematic diagram of an elevating mechanism of a sheet stacker.

FIG. 2 depicts an elevating mechanism of a sheet stacker.

In FIG. 2, reference numeral 6 denotes exit-to-shift-tray rollers, 13 denotes a return roller, 21 denotes a driving shaft, 22 denotes driven shafts, 23 denotes timing belts, 24 denotes a side plate, 25 denotes a worm gear, 30 denotes a sheet-level detecting lever, 32 denotes an end fence, 168 denotes a tray elevating motor, 333 denotes a tray-elevation limit switch, 334 denotes a tray-full detecting sensor, and 335 denotes a lower-limit sensor.

The return roller 13 is formed with sponge so that the return roller 13 comes into contact with a sheet discharged from the exit-to-shift-tray rollers 6 and causes a trailing edge of the sheet to abut against the end fence 32 (not shown), thereby catching the sheet. The return roller 13 is rotated by rotation of the exit-to-shift-tray rollers 6. When the shift tray 202 is elevated and pushes up the return roller 13, the tray-elevation limit switch 333, which is located near the return roller 13, is turned on to stop the tray elevating motor 168. Thus, this configuration prevents overrun of the shift tray 202.

As shown in FIG. 1, a sheet level sensor 330 serving as sheet-level detecting means that detects a level of sheets on the shift tray 202 is provided near the return roller 13.

The sheet level sensor 330 includes the sheet-level detecting lever 30 shown in FIG. 2, a sheet level sensor (for stapling) 330a, and a sheet level sensor (for non-stapling) 330b (not shown in FIG. 1). The sheet-level detecting lever 30 is pivotable about a shaft portion thereof and has a contact portion 30a and a fan-shaped shielding portion 30b. The contact portion 30a comes into contact with an upper surface of a rear end portion of a sheet stack on the shift tray 202. The sheet level sensor (for stapling) 330a located at an upper position is mainly used for controlling discharge of sheets to the stapled, and the sheet level sensor (for non-stapling) 330b is mainly used for controlling discharge of sheets to be shifted. In this configuration example, each of the sheet level sensor (for stapling) 330a and the sheet level sensor (for non-stapling) 330b outputs a detection signal when shielded by the shielding portion 30b.

Accordingly, when the shift tray 202 is elevated to cause the contact portion 30a of the sheet-level detecting lever 30 to pivot upward, the sheet level sensor (for stapling) 330a outputs no detection signal. When the contact portion 30a further pivots, the sheet level sensor (for non-stapling) 330b outputs a detection signal. When any one of the sheet level sensor (for stapling) 330a and the sheet level sensor (for non-stapling) 330b detects that a sheet stack has reached a predetermined level, the shift tray 202 is lowered by a predetermined distance. This configuration thus maintains a sheet level on the shift tray 202 at a substantially constant level.

The elevating mechanism for the shift tray 202 will be described in detail.

As shown in FIG. 2, a drive unit drives the driving shaft 21 to move the shift tray 202 up and down. Each of the timing belts 23 is wound around the driving shaft 21 and the driven shaft 22 with timing belt pulleys therebetween in a tensioned state. The side plate 24 that supports the shift tray 202 is fixed to the timing belts 23. This configuration allows a unitary structure including the shift tray 202 to be suspended to be movable up and down.

The tray elevating motor 168 is operable forward and backward and functions as a drive that moves the shift tray 202 up and down. A driving force generated by the tray elevating motor 168 is transmitted to a final gear of a gear train fixed to the driving shaft 21 via the worm gear 25. Because the worm gear 25 is interposed to this drive mechanism, the shift tray 202 can be held at a constant level, thereby preventing unintended fall of the shift tray 202 or the like accident.

A shield plate 24a is formed integrally with the side plate 24 of the shift tray 202. The tray-full detecting sensor 334, which detects a full-with-sheet state, and the lower limit sensor 335, which detects a lowest level position, are located below the side plate 24. Each of the tray-full detecting sensor 334 and the lower limit sensor 335 outputs a detection signal when shielded by the shield plate 24a. More specifically, each of the tray-full detecting sensor 334 and the lower limit sensor 335 is a photo sensor, and outputs a detection signal when shielded by the shield plate 24a. The exit-to-shift-tray rollers 6 are omitted from FIG. 2.

Figure 3:
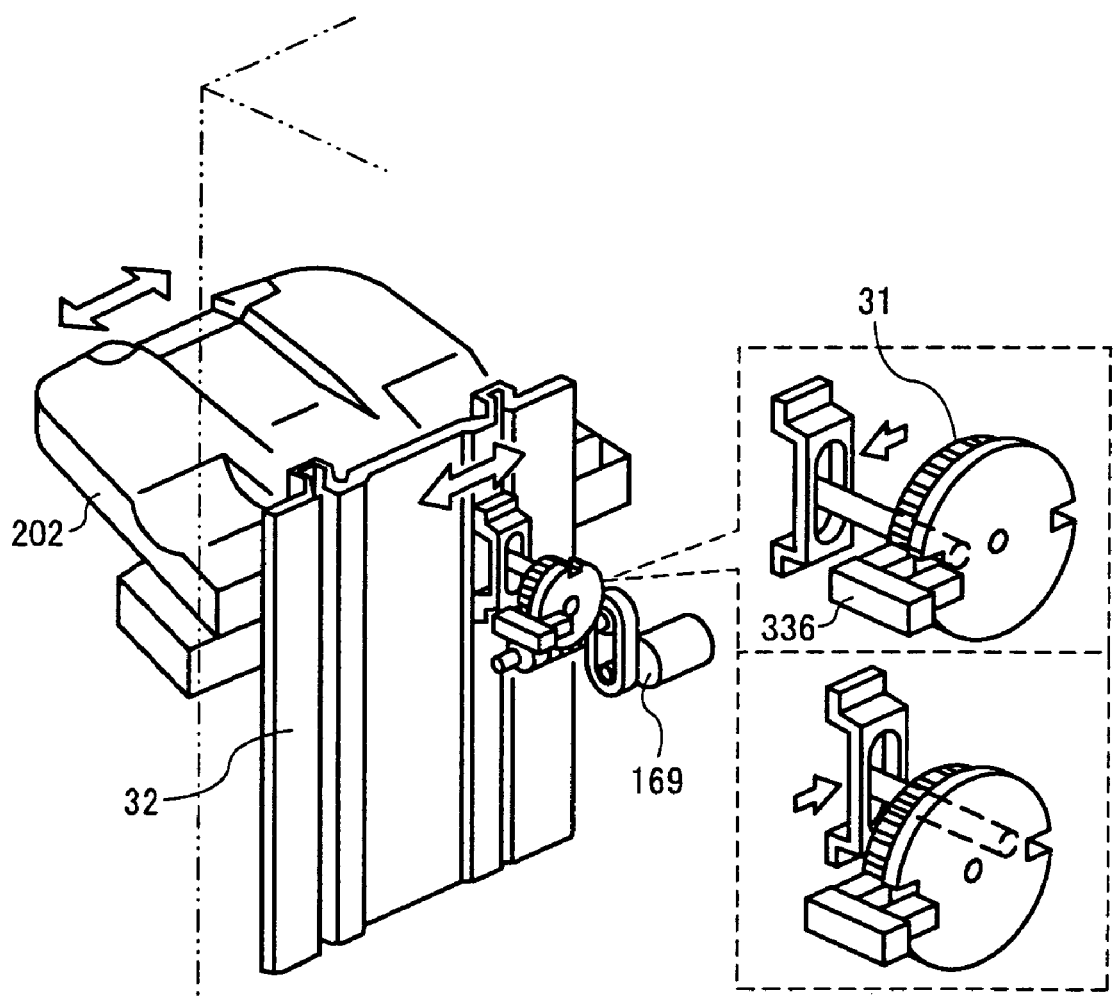
FIG. 3 is a schematic diagram of a shifting mechanism of the sheet stacker.

FIG. 3 depicts a shifting mechanism of the sheet stacker.

In FIG. 3, reference numeral 31 denotes a shift cam, 169 denotes a shift motor, and 336 denotes a shift sensor.

As shown in FIG. 3, in a swing mechanism for the shift tray 202, the shift motor 169, functioning as a drive, rotates the shift cam 31. A pin uprightly extends from the shift cam 31 at a position away from a center of a rotary axis of the shift cam 31 by a predetermined distance. The pin fits into an elongated hole defined in the end fence 32. The end fence 32 guides a trailing edge of a sheet stack on the shift tray 202 and engages with the shift tray 202 in a direction perpendicular to a sheet discharging direction. As the shift cam 31 rotates, the end fence 32, into which the pin fits, moves in the direction perpendicular to the sheet discharging direction, thereby moving the shift tray 202. In the image forming apparatus shown in FIG. 1, a side closer to a viewer of the drawing will be referred to as a "near side" below, while a side more distant from the viewer will be referred to as a "far side". The shift tray 202 is stopped at any one of two positions; a near-side position and a far-side position. The shift tray 202 is stopped at one of the stop positions by turning the shift motor 169 on and off based on a detection signal output from the shift sensor 336.

Figure 4:
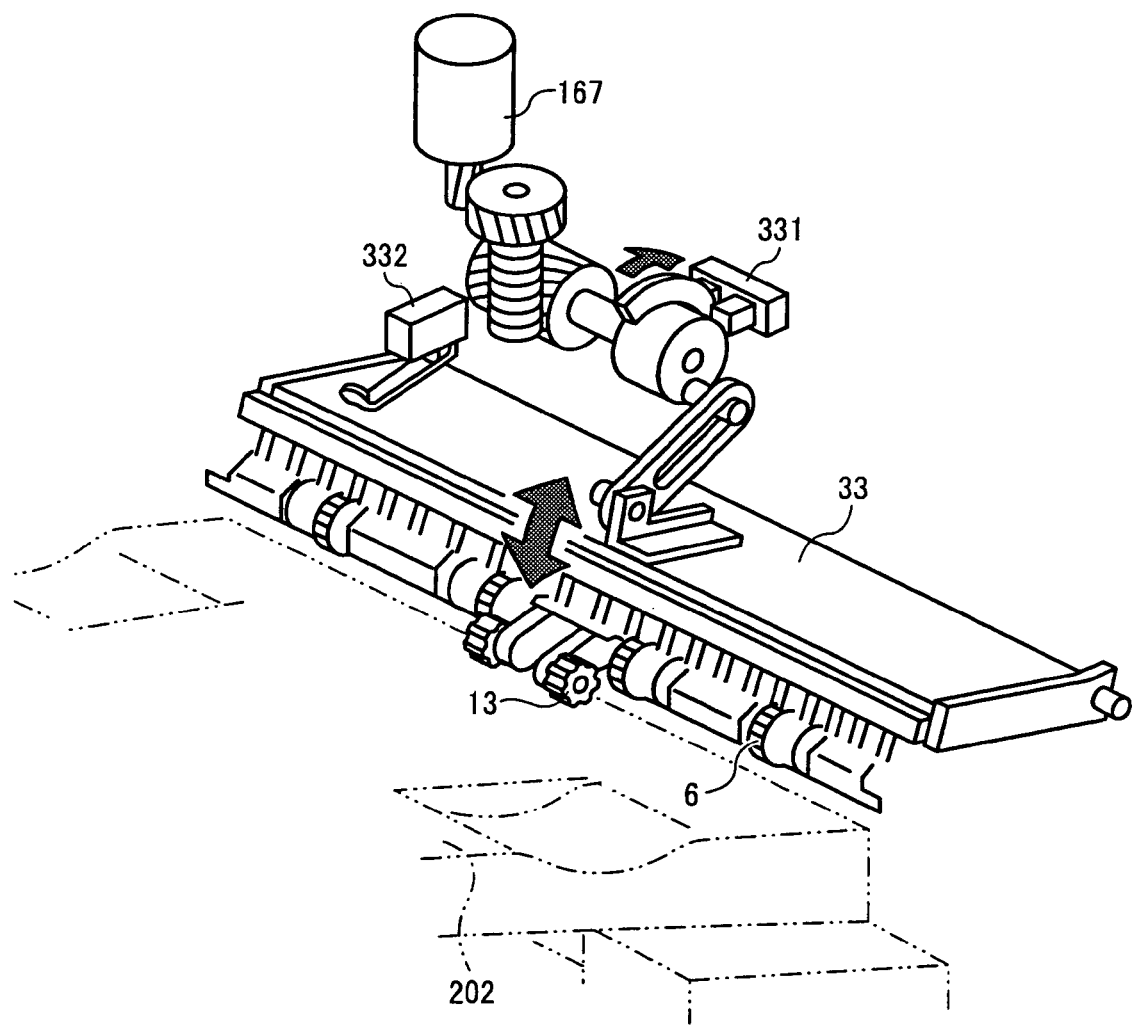
FIG. 4 is a schematic diagram for explaining operations of an opening/closing guide plate.

FIG. 4 is a schematic diagram for explaining operations of an opening/closing guide plate.

In FIG. 4, reference numeral 33 denotes the opening/closing guide plate, 167 denotes a sheet-exit-guide-plate opening/closing motor, and 331 denotes a sheet-exit-guide-plate opening/closing sensor.

The exit-to-shift-tray rollers 6 have a driving roller 6a and a driven roller 6b. As shown in FIGS. 1 and 4, the driving roller 6a is rotatably supported by a free end of the opening/closing guide plate 33, which is supported at an upstream portion thereof in the sheet discharging direction to be vertically pivotable. The driven roller 6b is brought into contact with the driving roller 6a by its own weight or a biasing force, thereby nipping a sheet between the driving roller 6a and the driven roller 6b to discharge the sheet. When a batch of sheets (hereinafter, "sheet bundle") having been stapled is to be discharged, the opening/closing guide plate 33 pivots upward and then returns at a specified timing. This timing is determined based on a detection signal output from an exit-to-shift-tray sensor 303 (FIG. 1). The opening/closing guide plate 33 is driven by the sheet-exit-guide-plate opening/closing motor 167 and stops at a position that is determined based on a detection signal output from the sheet-exit-guide-plate opening/closing sensor 331.

Figure 5:
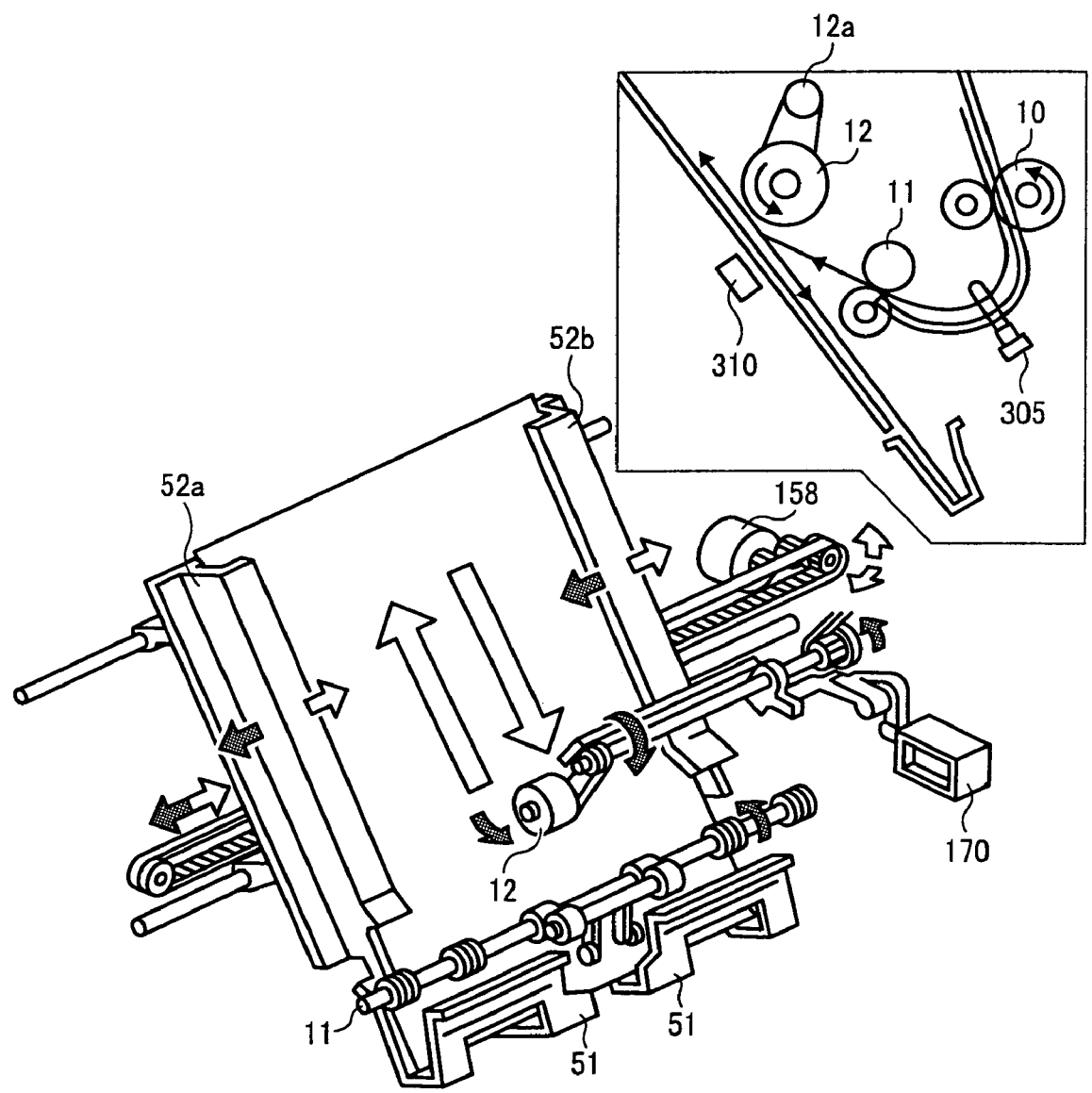
FIG. 5 is a schematic diagram for explaining stapling process.

FIG. 5 is a schematic diagram for explaining stapling.

In FIG. 5, numeral 11 denotes the exit-to-stapler rollers, 12 denotes a tapping roller, 52 denotes a discharging belt, 53 denotes jogger fences (more specifically, jogger fences 53a and 53b), 158 denotes jogger motors, 170 denotes a tapping solenoid (SOL), and S1 denotes an edge stitch stapler.

As shown in FIG. 5, sheets are guided by the exit-to-stapler rollers 11 to the stapling unit F and stacked therein on one another. Each time a sheet is thus stacked, the tapping roller 12 aligns the sheet stack in a longitudinal direction (sheet transport direction) while the jogger fences 53 align the same in a lateral direction (sheet width direction, which is perpendicular to the sheet transport direction). A controller 350 (not shown in FIG. 5, however, to be described later with reference to FIG. 25) sends a stapling signal to actuate the edge stitch stapler S1 during an interval between consecutive jobs; more specifically, an interval between a job for a last sheet of a current sheet bundle and that for a first sheet of a next sheet bundle, thereby causing the edge stitch stapler S1 to staple the current sheet bundle. The thus-stapled sheet bundle is conveyed on the discharging belt 52 (FIG. 1) having a support rib 52a to the exit-to-shift-tray rollers 6, which outputs the sheet bundle onto the shift tray 202 having been set to a receiving position.

As shown in FIG. 5, the tapping SOL 170 imparts a pendular motion about a supporting point 12a to the tapping roller 12, which in turn intermittently causes the sheet having been fed to the stapling unit F to abut a rear end fence 51. The tapping roller 12 rotates counterclockwise. The jogger motors 158, which are operable forward and backward, drive the jogger fences 53 via the timing belts 23 to reciprocate in the sheet width direction. (In the example configuration, each of the jogger fences 53a, 53b is separately actuated by a corresponding one of the jogger motors 158, which will be described later in detail.)

Figure 6:
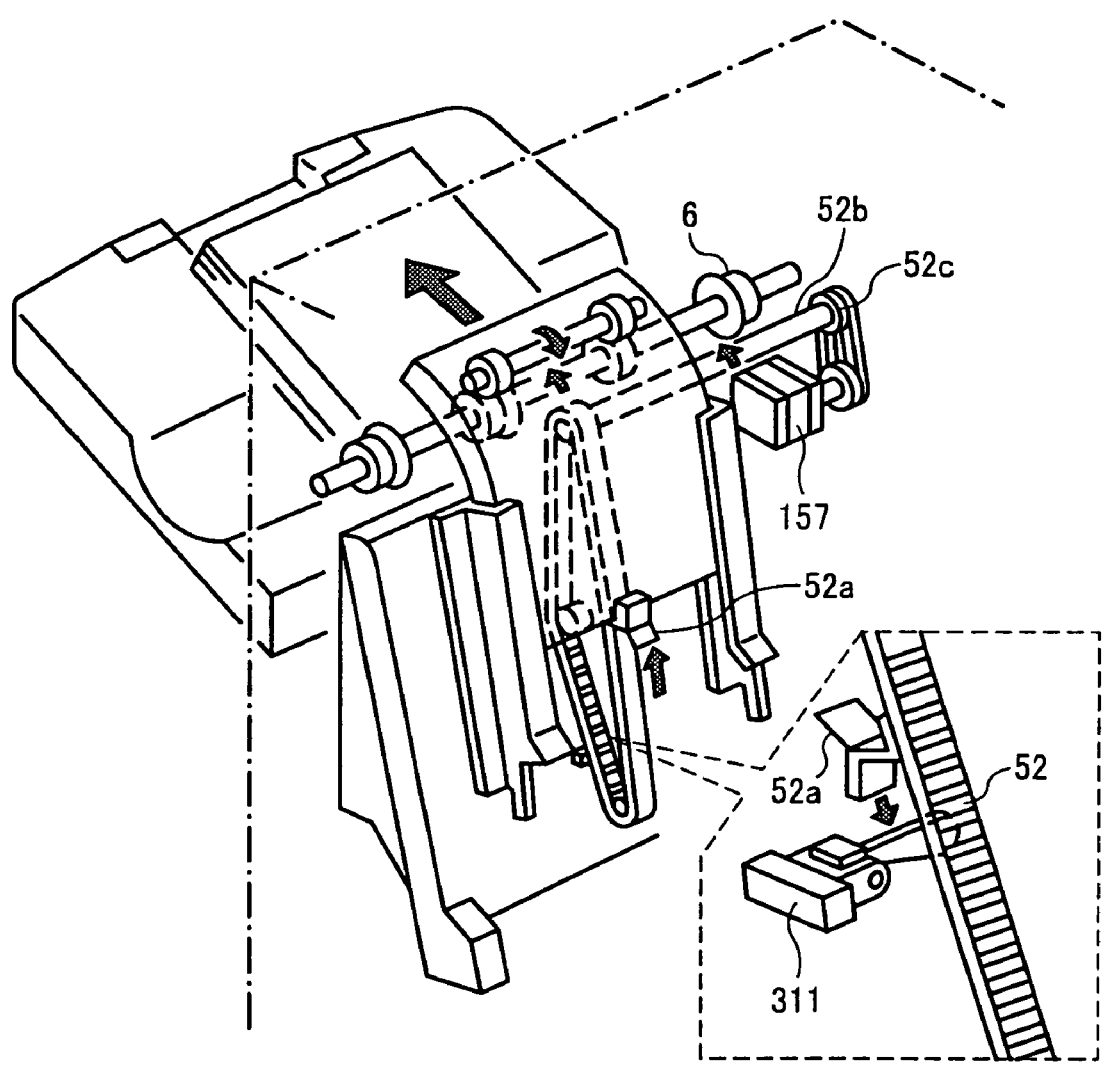
FIG. 6 is a schematic diagram for explaining operations of a discharging belt.

FIG. 6 is a schematic diagram for explaining operations of the discharging belt 52.

In FIG. 6, reference numeral 311 denotes a discharging-belt home position (HP) sensor.

Figure 7:
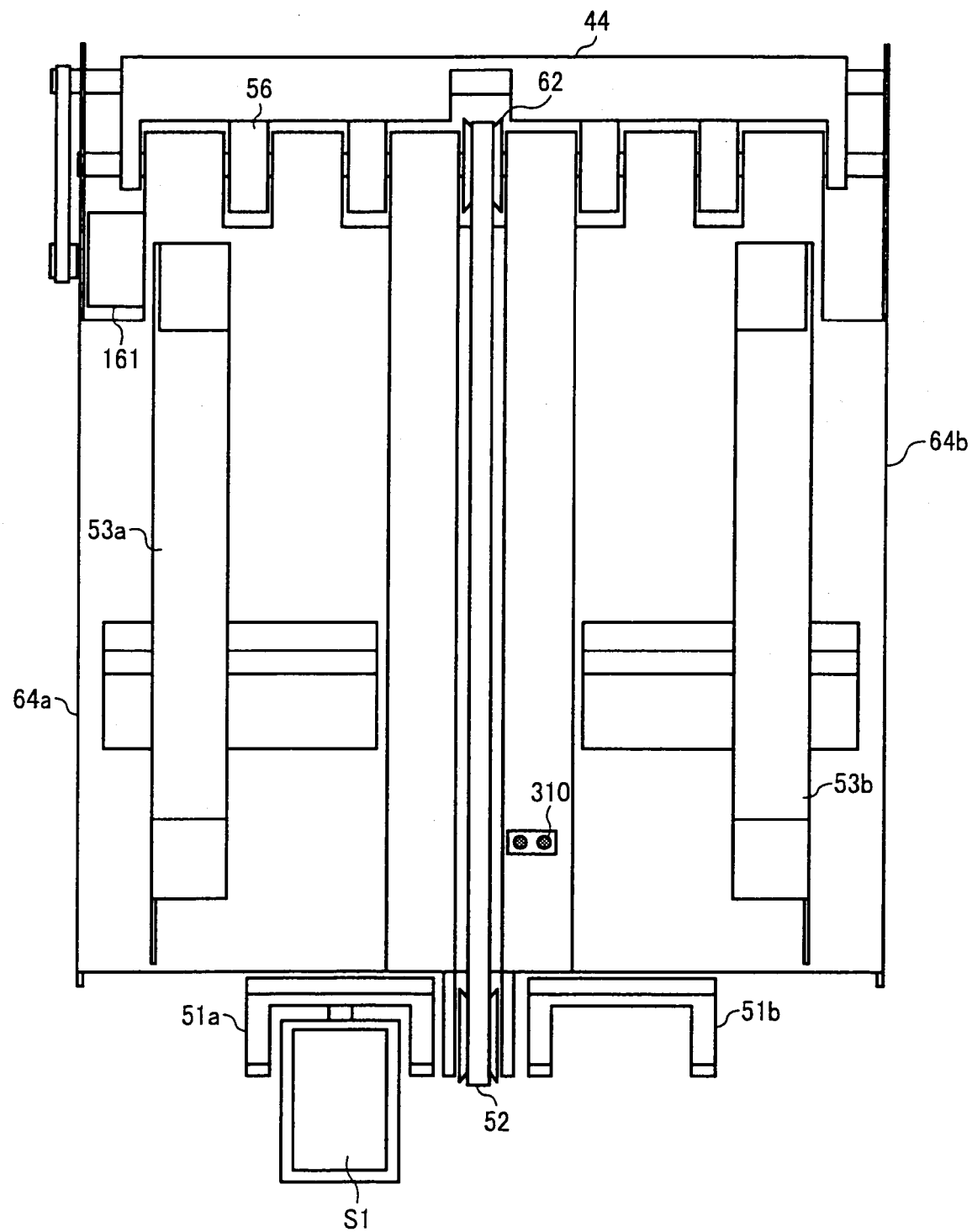
FIG. 7 is a plan view a stapling unit.

FIG. 7 is a plan view the stapling unit F.

In FIG. 7, reference numeral 56 denotes discharging rollers.

As shown in FIG. 6, the discharging-belt HP sensor 311 detects the support rib 52a provided on the discharging belt 52 when the support rib 52a is at a home position thereof. In other words, a state of the discharging-belt HP sensor 311 is switched between a detection-positive state and a detection-negative state by the support rib 52a. Two support ribs 52a and 52a' are situated on an outer surface of the discharging belt 52 at positions facing to each other, thereby alternately conveying a sheet bundle out of the stapling unit F. A rotating direction of the discharging belt 52 can be reversed so that a leading edge of a sheet bundle housed in the stapling unit F are aligned in the sheet transport direction against back surfaces of the support ribs 52a and 52a', which are on standby for conveying the sheets.

As shown in FIG. 6, the discharging belt 52 is driven by a discharging motor 157 via a driving shaft 52b and a pulley 52c. As shown in FIG. 7, the discharging rollers 56 are arranged to be coaxial with the driving shaft 52b and bilaterally symmetrical with respect to the discharging belt 52. A circumferential velocity of the discharging rollers 56 is set to be greater than that of the discharging belt 52. For simplicity, the discharging rollers 56 are not shown in FIG. 6.

Figure 8:
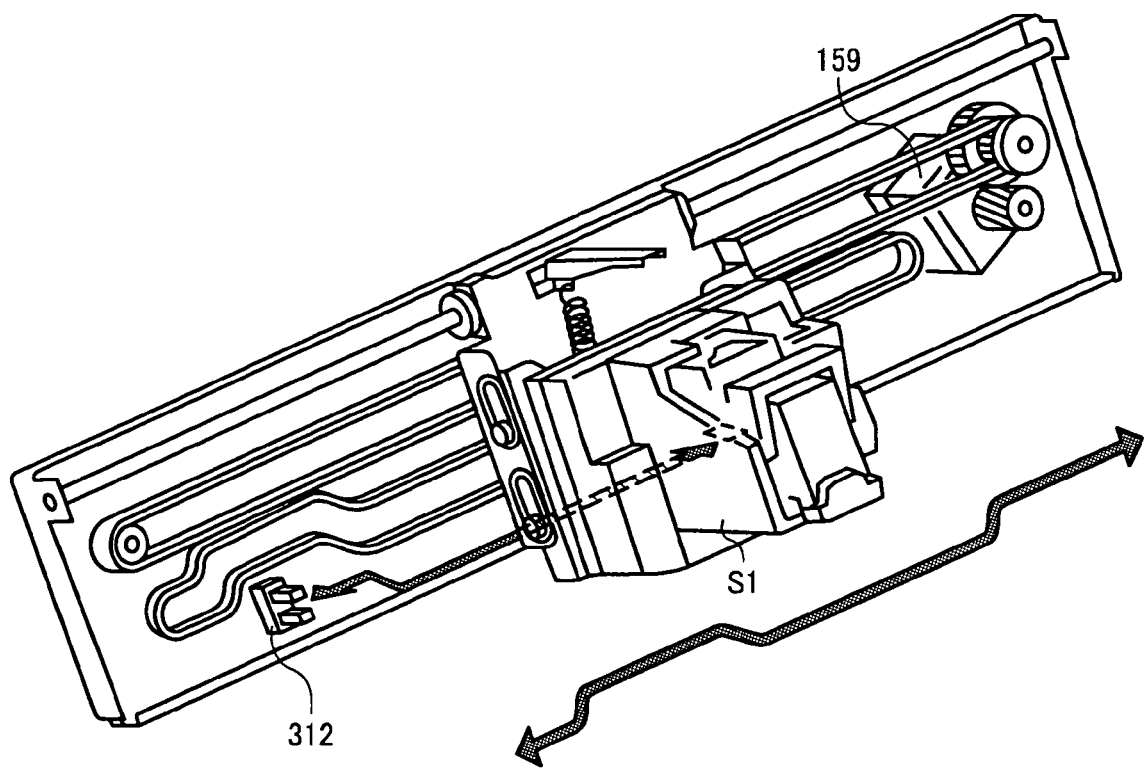
FIG. 8 is a schematic diagram for explaining a moving mechanism of a stapler.

FIG. 8 is a schematic diagram for explaining a moving mechanism of the edge stitch stapler S1.

In FIG. 8, reference numeral 159 denotes a stapler moving motor and 312 denotes a stapler HP sensor.

As shown in FIG. 8, the edge stitch stapler S1 is driven by the stapler moving motor 159, which is operable forward and backward, via the timing belts 23 to move in the sheet width direction to staple a sheet bundle at a predetermined end position of the sheet bundle. The stapler HP sensor 312 that detects a home position of the edge stitch stapler S1 is provided at an end of a movable range of the edge stapling stapler S1. A stapling position in the sheet width direction is changed by controlling a distance by which the edge stitch stapler S1 moves from the home position.

Next, a mechanism for flattening a curve of a rear end of a sheet bundle stacked in the stapling unit F will be described below with reference to FIGS. 9 to 13.

Figure 9:
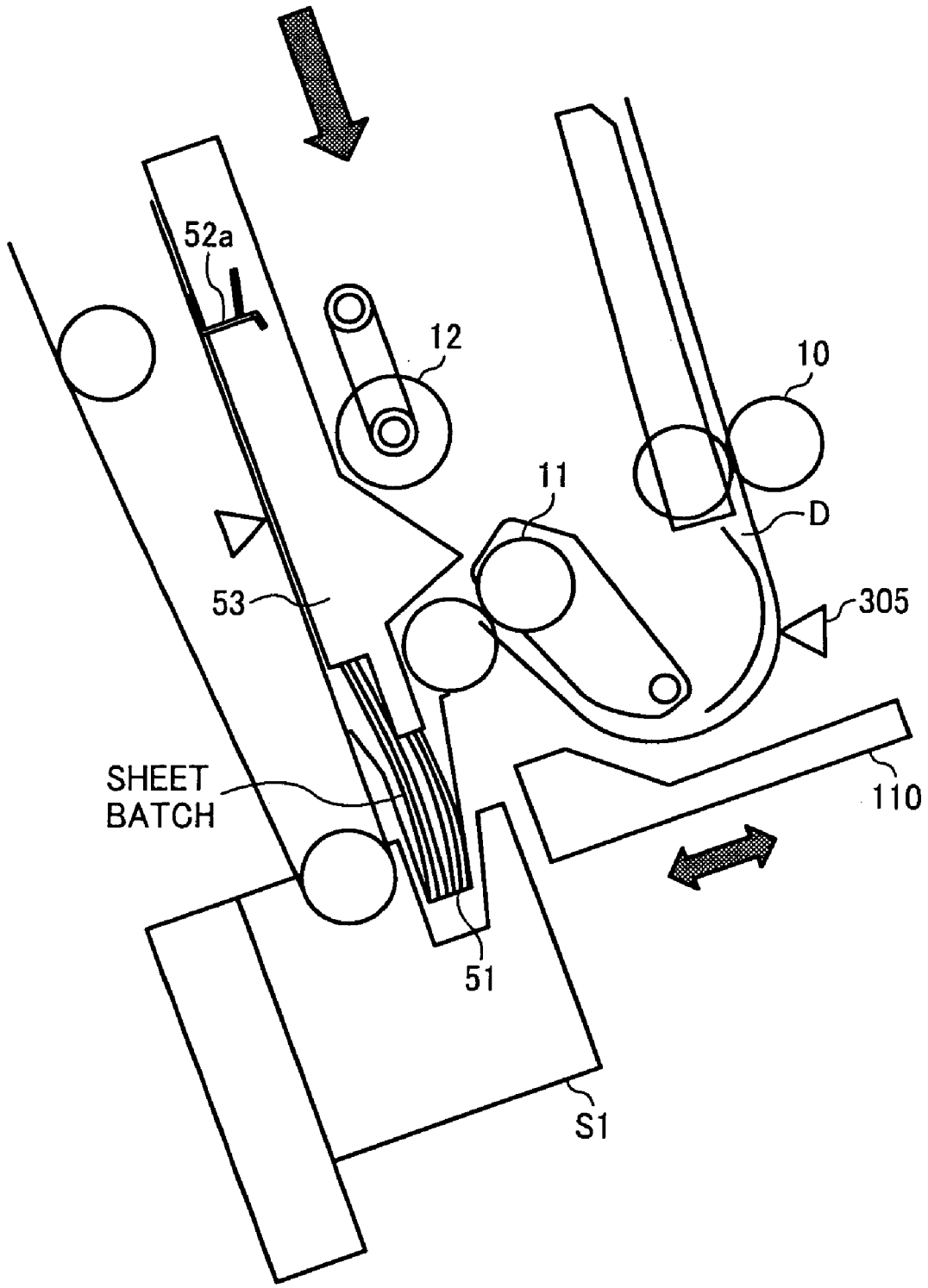
FIG. 9 is a schematic diagram for explaining a rear-end retaining mechanism.

FIG. 9 is a schematic diagram for explaining the rear-end retaining mechanism.

In FIG. 9, reference numeral 110 denotes a rear-end retaining lever (rear-end retaining levers 110a, 110b, and 110c) and 305 denotes an exit-to-stapler sensor.

Each time a sheet is discharged onto the stapling unit F, the tapping roller 12 aligns a sheet bundle in the stapling unit F in the longitudinal direction (sheet transport direction) as described above. However, when the sheet bundle in the stapling unit F is curled at a rear end or highly flexuous, the sheet bundle can be bent at a rear end thereof by its own weight, causing the sheet bundle to occupy a larger space in the stapling unit F. As the number of stacked sheets increases, a space in the rear end fence 51 allowed for a subsequent sheet becomes narrower. This adversely affects alignment of sheets in the longitudinal direction.

The rear-end retaining mechanism is provided to flatten the curve of the rear end of the sheet bundle, thereby facilitating entry of subsequent sheets into the rear end fence 51.

FIGS. 10 to 13 are schematic diagrams for explaining effects of the rear-end retaining lever 110.

In FIGS. 10 to 13, reference numeral 111 denotes an HP sensor, 112 denotes a rear-end-retaining-lever motor, 113 denotes a pulley, 114 denotes a timing belt, and 115 denotes a spring.

Figure 10:
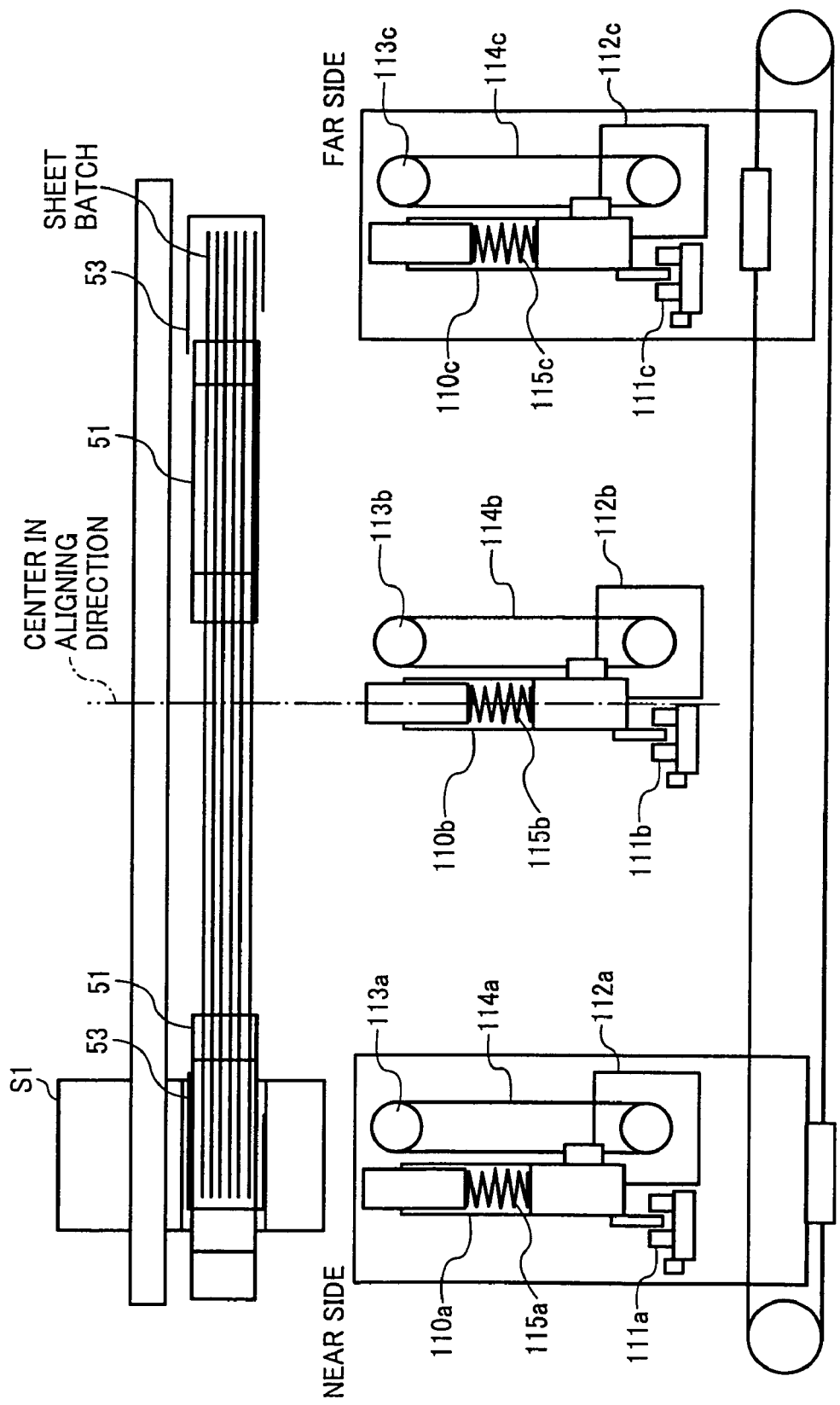
FIGS. 10 to 13 are schematic diagrams for explaining effects of a rear-end retaining lever.

As shown in FIG. 10, the rear-end retaining levers 110a, 110b, and 110c, each of which retain a rear end of a sheet bundle stacked in the stapling unit F, are located at a near side, at a center, and at a far side of the sheet finisher along the moving direction of the edge stitch stapler S1, respectively. A mechanism of the rear-end retaining lever 110a at the near side is taken an example and described below. The rear-end retaining lever 110a is fixed to a timing belt 114a, which is actuated by a rear-end-retaining-lever motor 112a via a pulley 113a. Accordingly, the rear-end retaining lever 110a is rotated concurrently with rotation of the rear-end-retaining-lever motor 112a. An HP sensor 111a detects that the rear-end retaining lever 110a is at a home position thereof when the HP sensor 111a is shielded by a projecting portion of the rear-end retaining lever 110a. The home position is situated so as not to interfere with the edge stitch stapler S1 in the movable range of the edge stitch stapler S1 in the direction indicated by arrows in FIG. 8 (the edge stitch stapler S1 moves in the sheet width direction to staple an end portion of sheets). A distance by which the rear-end retaining lever 110a is moved in a direction to press a rear end of the sheet bundle; that is, a direction indicated by arrows in FIG. 9, is determined based on a count of pulses inputted to the rear-end-retaining-lever motor 112a. The rear-end retaining lever 110a is moved to a position at which a leading end of the rear-end retaining lever 110a contacts the sheet bundle and flattens the curve of the rear end of the sheet bundle. A spring 115a is provided so that expansion or contraction of the spring 115a accommodates variations in thickness of the sheet bundle stacked on the tray.

Each of the rear-end retaining levers 110b and 110c operates in the same manner as the rear-end retaining lever 110a.

Figure 11:
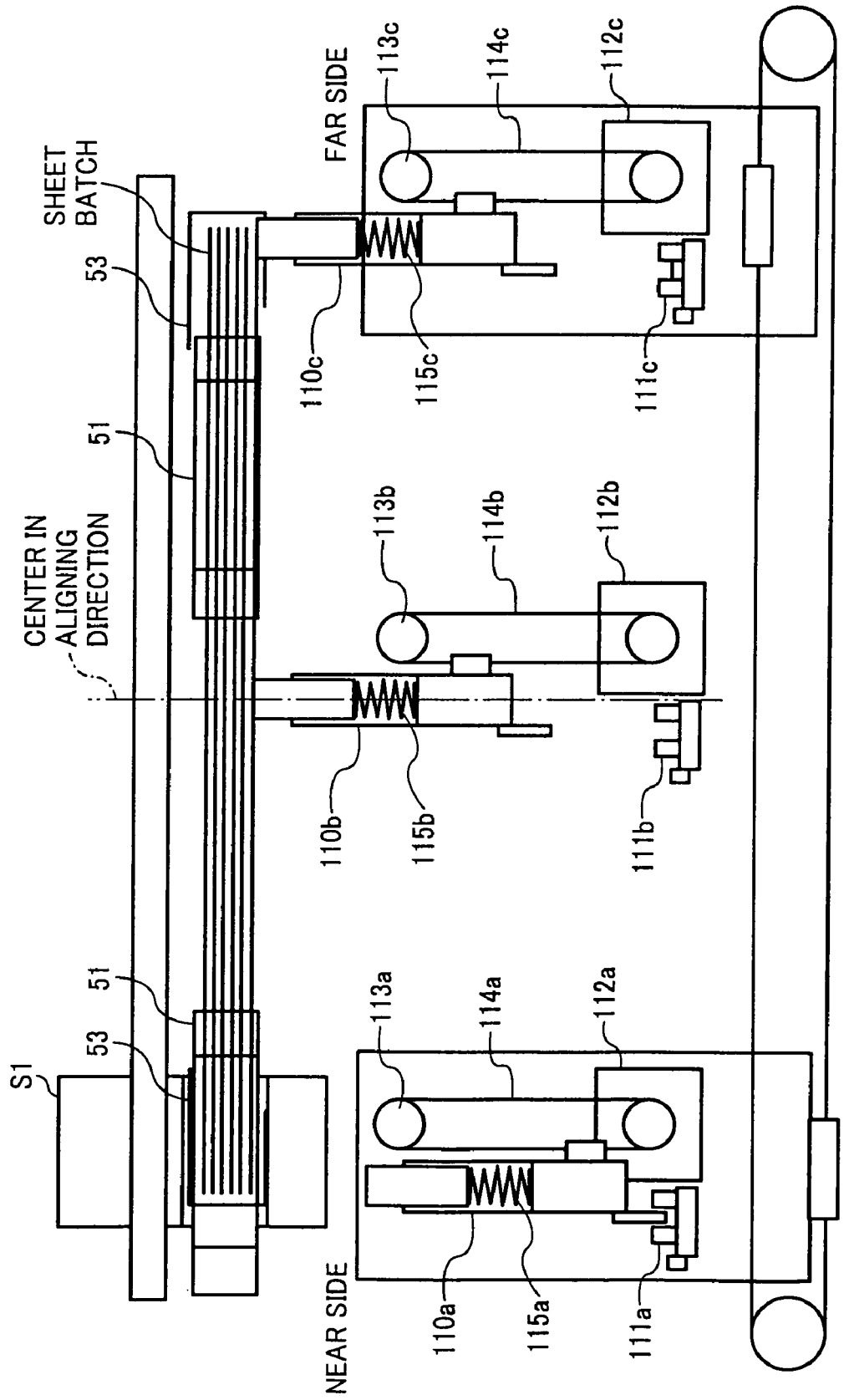
Figure 12:
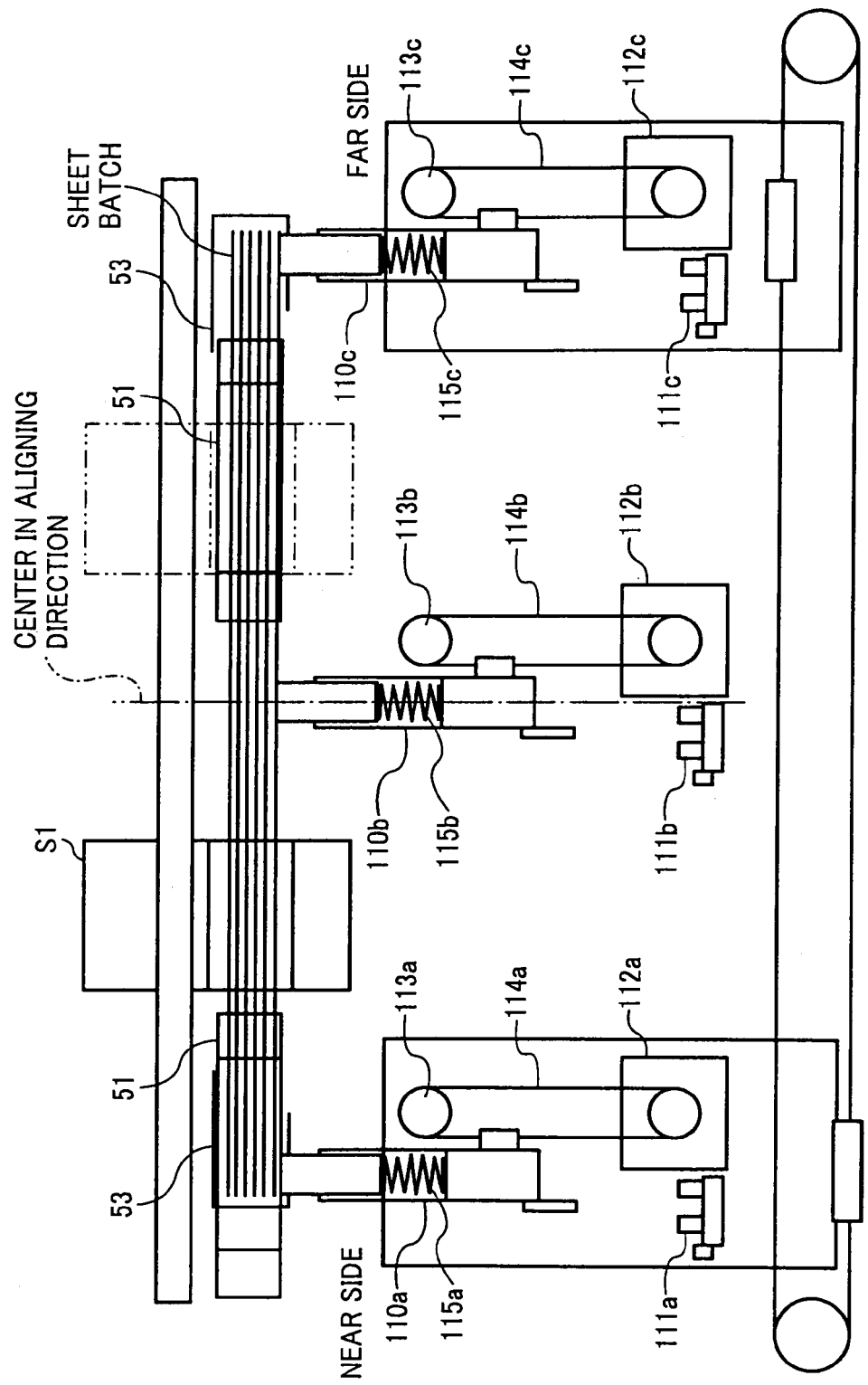
Figure 13:
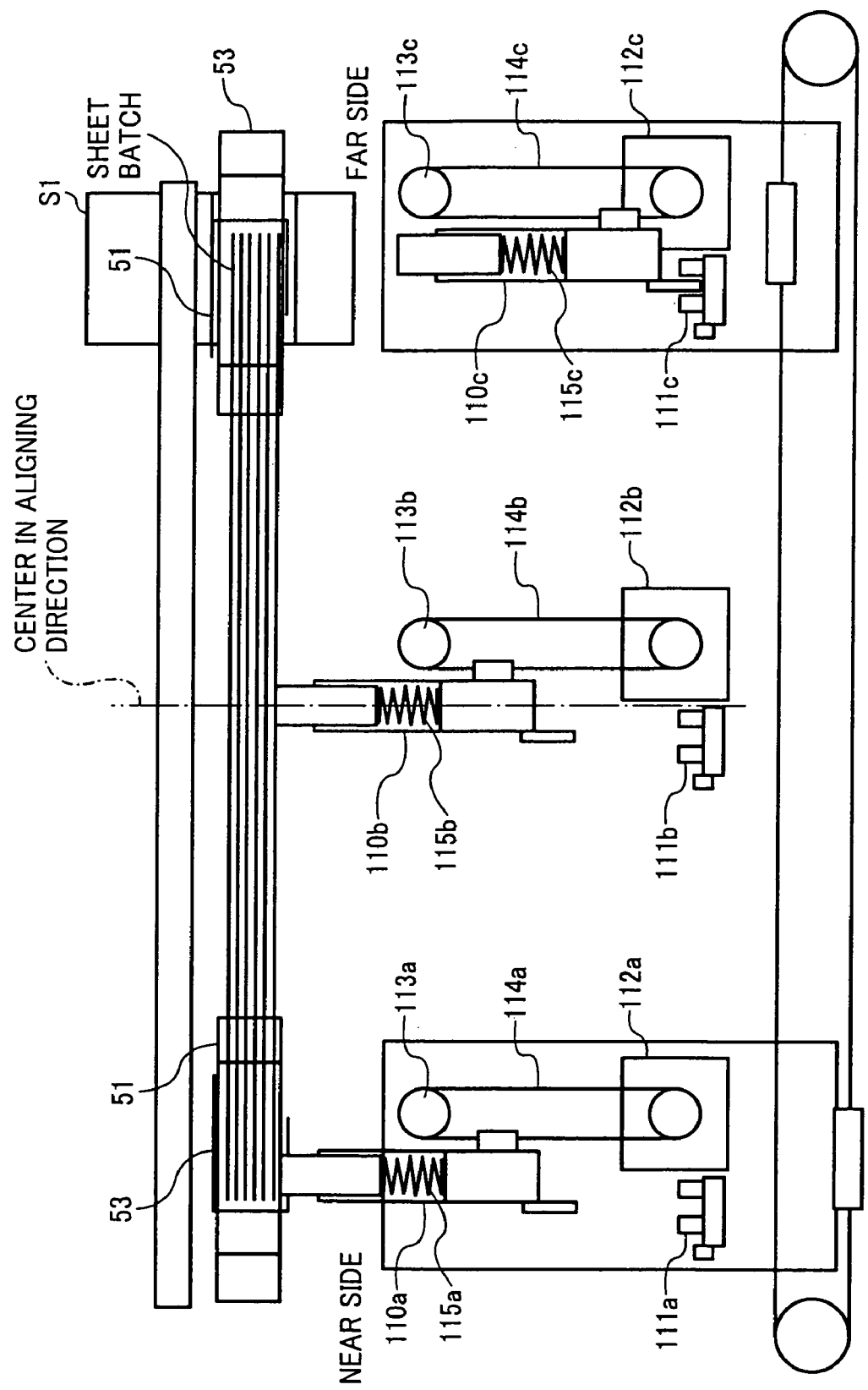

Operations of the rear-end retaining levers 110a, 110b, and 110c in different stapling modes will be described. FIGS. 11, 12, and 13 depict the edge stitch stapler S1 at a standby position for near-edge stapling, that for two-position stapling, and that for far-edge stapling, respectively. It is necessary to prevent the edge stitch stapler S1 from interfering with a motion of the rear-end retaining lever 110 at each of the standby positions. For the near-edge stapling, the rear-end retaining levers 110b and 110c are allowed to move. For the two-position stapling, the rear-end retaining levers 110a, 110b, and 110c are allowed to move. For the far-edge stapling, the rear-end retaining levers 110a and 110b are allowed to move. FIGS. 11 to 13 depict operating positions of the rear-end retaining levers 110a, 110b, and 110c at the stapling modes.

The rear-end retaining lever 110 is actuated during an interval between a time when a discharged sheet has been stacked in the rear end fence 51 and jogged in the sheet width direction by the jogger fences 53 and a time when a subsequent sheet has been aligned by the tapping roller 12.

A configuration of a sheet-batch direction-changing unit will be described with reference to FIGS. 14 to 15C.

Figure 14:
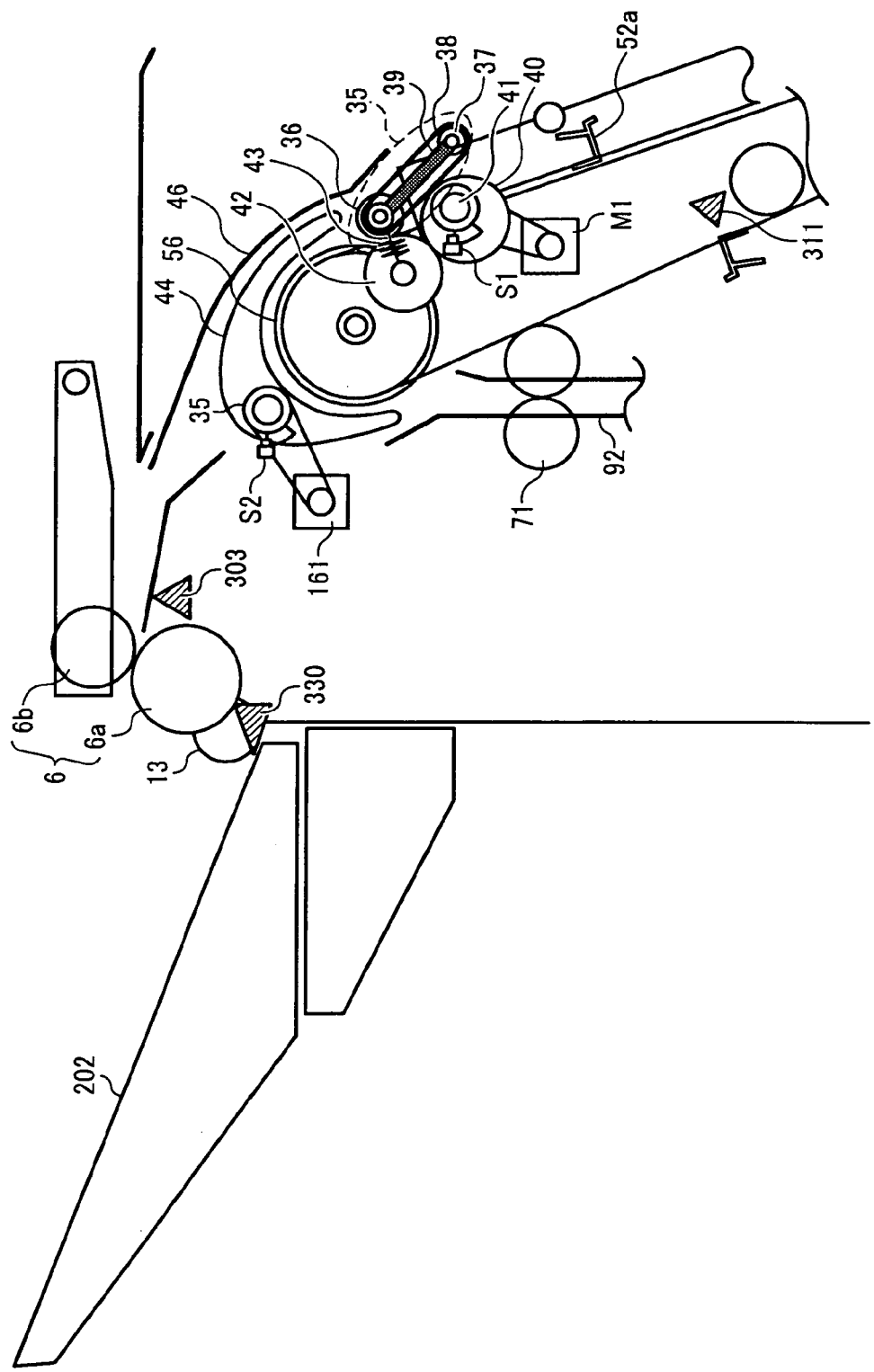
FIG. 14 is a schematic diagram for explaining operations of feeding a sheet bundle out of the stapling unit.

FIG. 14 is a schematic diagram for explaining operations of sending a sheet bundle out of the stapling unit F.

In FIG. 14, reference numeral 36 denotes a roller, 37 denotes a driving shaft, 38 denotes a timing belt, 39 denotes an arm, 40 denotes a cam, 41 denotes a rotary shaft of the cam 40, 42 denotes a driven roller, and 43 denotes an elastic member.

Figure 15A:
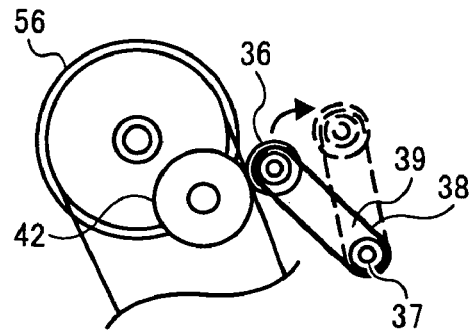
FIGS. 15A to 15C are schematic diagrams for illustrating different configurations of a transporting unit.
Figure 15B:
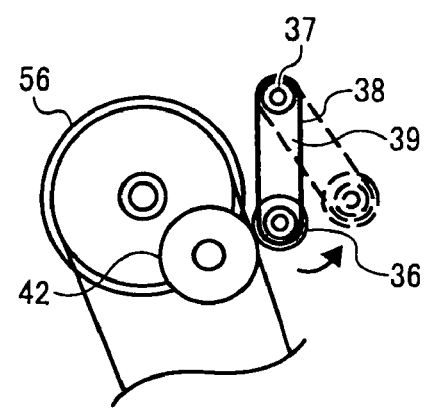
Figure 15C:
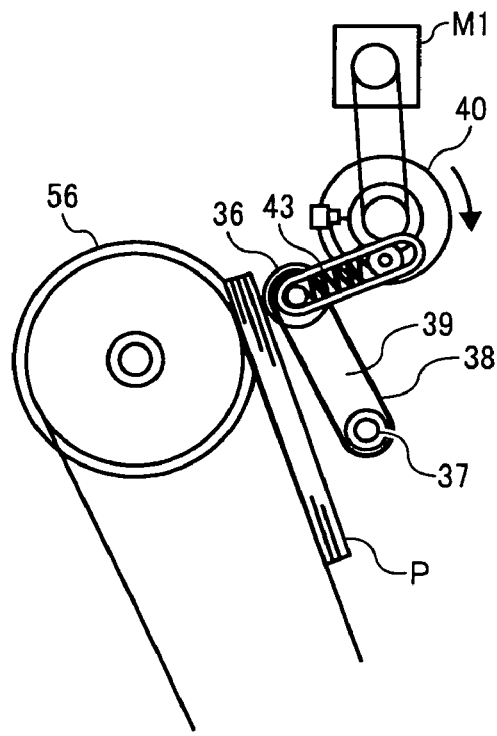

FIGS. 15A to 15C depict different configurations of a transporting unit.

As shown in FIGS. 1 and 14, the transport paths, on which a sheet bundle is transported from the stapling unit F to the folding unit G and from the stapling unit F to the shift tray 202, and the transporting unit that transports the sheet bundle include a conveyer 35 that imparts a moving force to the sheet bundle, the discharging rollers 56 that cause the sheet bundle to turn, and the guide member 44 that guides turning of the sheet bundle. These elements will be described in detail below. As shown in FIG. 14, the timing belt 38 transmits a rotation of the driving shaft 37 to the roller 36 of the conveyer 35. The roller 36 and the driving shaft 37 are coupled by the arm 39 to be rotatable about the driving shaft 37. The cam 40 is rotated about the rotary shaft 41 by a motive force transmitted from a motor M1 to be rotated and in turn rotates the roller 36 of the conveyer 35. As the configuration of the conveyer 35, any one that shown in FIG. 15A and that shown in FIG. 15B is applicable. A sensor S1 detects the cam 40 that rotates the conveyer 35 when the cam 40 is at a home position thereof. A rotation angle of the cam 40 relative to the home position can be controlled by adding another sensor to the configuration shown in FIG. 14. Alternatively, the rotation angle can be adjusted by controlling pulses applied to the motor M1. The driven roller 42 is situated to oppose to the roller 36 of the conveyer 35. The driven roller 42 and the roller 36 nip a sheet bundle therebetween while pressing the sheet bundle with the elastic member 43, thereby imparting a moving force to the sheet bundle. As the thickness of the sheet bundle increases, the higher moving force; that is, higher pressing force, is required. To attain this, the configurations shown in FIGS. 15A and 15B can be employed. Alternatively, the configuration shown in FIG. 15C, in which the cam 40 presses the roller 36 of the conveyer 35 against the sheet bundle with the elastic member 43 therebetween, and the pressing force is controlled by adjusting a pressing angle of the cam 40, can be employed.

Figure 16A:
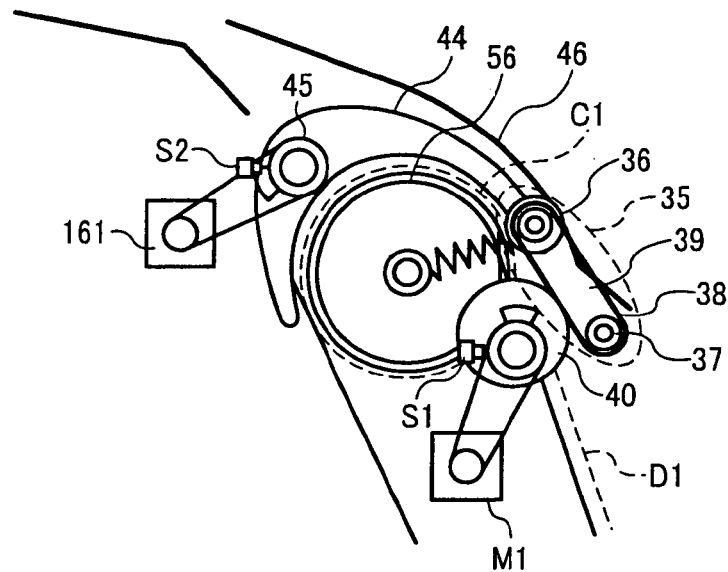
FIGS. 16A and 16B are schematic diagrams for illustrating modified examples of the transporting unit.
Figure 16B:
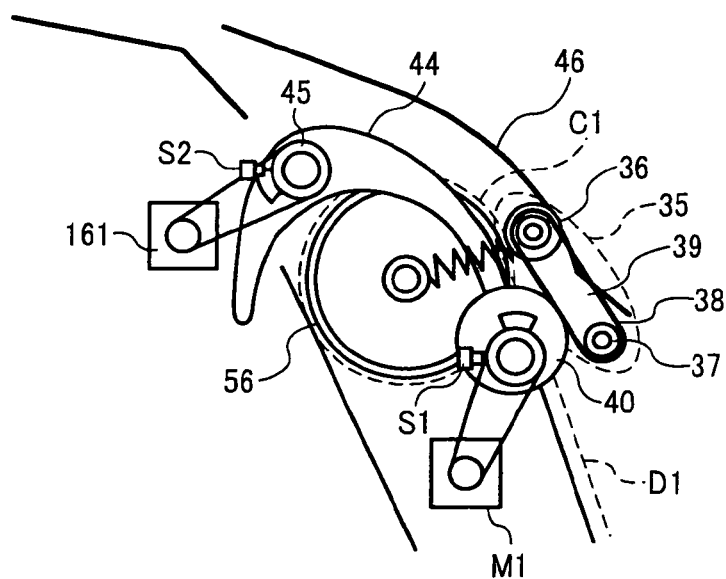

FIGS. 16A and 16B are schematic diagrams for explaining modifications the transporting unit.

In FIGS. 16A and 16B, reference numeral 45 denotes a pivot center of the guide member 44, 46 denotes a guide plate, and 161 denotes a path-switching motor.

As shown in FIG. 16A, a roller situated to oppose to the roller 36 of the conveyer 35 can be used as the discharging rollers 56 in place of the driven roller 42. In this configuration, the roller 36 and the discharging rollers 56 are set to nip at a position near a contact point between a conveyance trajectory D1 of the sheet bundle and a concentric circle C1 of the discharging rollers 56. The discharging rollers 56 and the guide member 44 on the side opposite from the discharging rollers 56 define the transport path that transports a sheet bundle from the stapling unit F to the folding unit G. The guide member 44 is driven to pivot about the pivot center 45 by a motive force transmitted from the path-switching motor 161. A sensor S2 detects the guide member 44 when the guide member 44 is at a home position thereof. As shown in FIG. 16B, the guide member 44 at a position pivotally about moved the pivot center 45 and the guide plate 46 define the transport path that transports a sheet bundle from the stapling unit F to the shift tray 202, which is a stacking unit.

A basic transport operation according to the example configuration will be described below with reference to FIGS. 17 to 20.

FIG. 17 depicts a state immediately before an aligned sheet bundle is transported out of the stapling unit F.

The support rib 52a pushes up a trailing edge of the sheet bundle having been aligned in the stapling unit F as shown in FIG. 17 to transport the sheet bundle from the stapling unit F to the folding unit G. Thereafter, the roller 36 of the conveyer 35 and the driven roller 42, which face to each other, nip the sheet bundle therebetween, thereby imparting a moving force to the sheet bundle. The sheet bundle is on standby at a position, at which the leading edge of the sheet bundle does not interfere with the roller 36 of the conveyer 35.

Figure 18A:
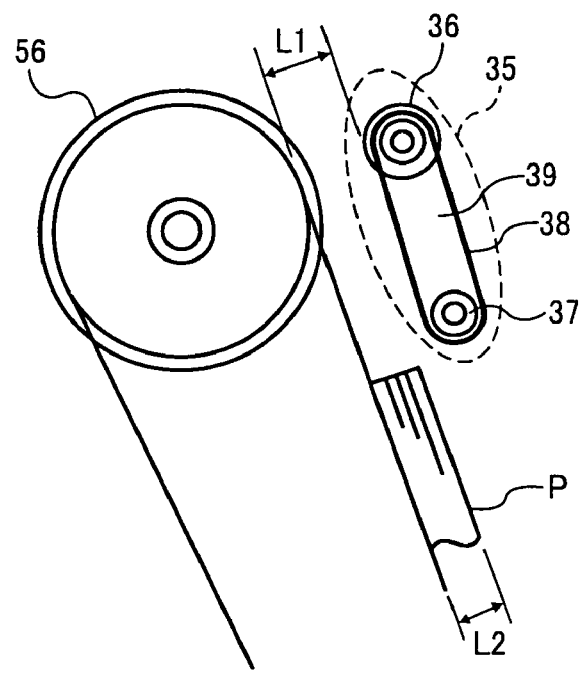
FIGS. 18A and 18B are schematic diagrams for explaining a relationship between a thickness of a sheet bundle and a position of a roller.
Figure 18B:
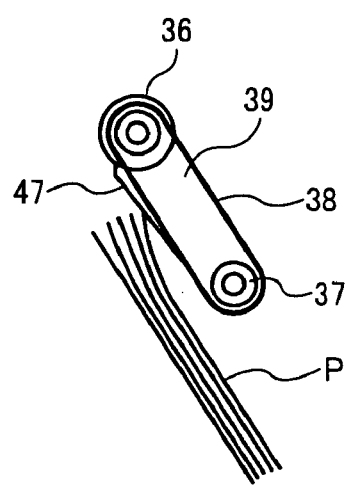

FIGS. 18A and 18B are schematic diagrams for explaining a relationship between a thickness of a sheet bundle and a position of the roller 36.

In FIG. 18B, reference numeral 47 denotes a guide.

Reference sign L1 denotes a distance between a surface, on which the sheet bundle is stacked during alignment performed in the stapling unit F, or a surface, along which the sheet bundle is guided by being pushed up by the support rib 52a, and the roller 36. As shown in FIG. 18A, the distance L1 is set to be greater than a maximum thickness L2 of a sheet bundle to be transported from the stapling unit F to the folding unit G to prevent collision between the leading end of the sheet bundle and the roller 36. Because the thickness of the sheet bundle in the stapling unit F varies depending on the number of sheets to be aligned or a type of sheet, a closest retreated position, at which collision of the roller 36 against the leading end of the sheet bundle can be avoided, varies. Accordingly, by changing the retreated position in accordance with a data set about the number of sheets and the type of sheet, the traveling time required for the sheet bundle to move from the retreated position to a position, at which the moving force is imparted to the sheet bundle, can be minimized, thereby providing advantages for productivity. The data set can be a job data set supplied from the image forming apparatus or obtained via sensors provided in the sheet finisher. However, when a sheet bundle having been aligned in the stapling unit F has a curl of a radius exceeding an assumable range, a leading end of the sheet bundle can contact with the roller 36 by being pushed up by the support rib 52a. Therefore, as shown in FIG. 18B, it is necessary to provide the guide 47 immediately upstream from the roller 36 so that the leading end of the sheet bundle and the roller 36 form a small contact angle. The guide 47 can be formed from any one of a solid material and an elastic material, both of which yield similar effects.

Figure 19:
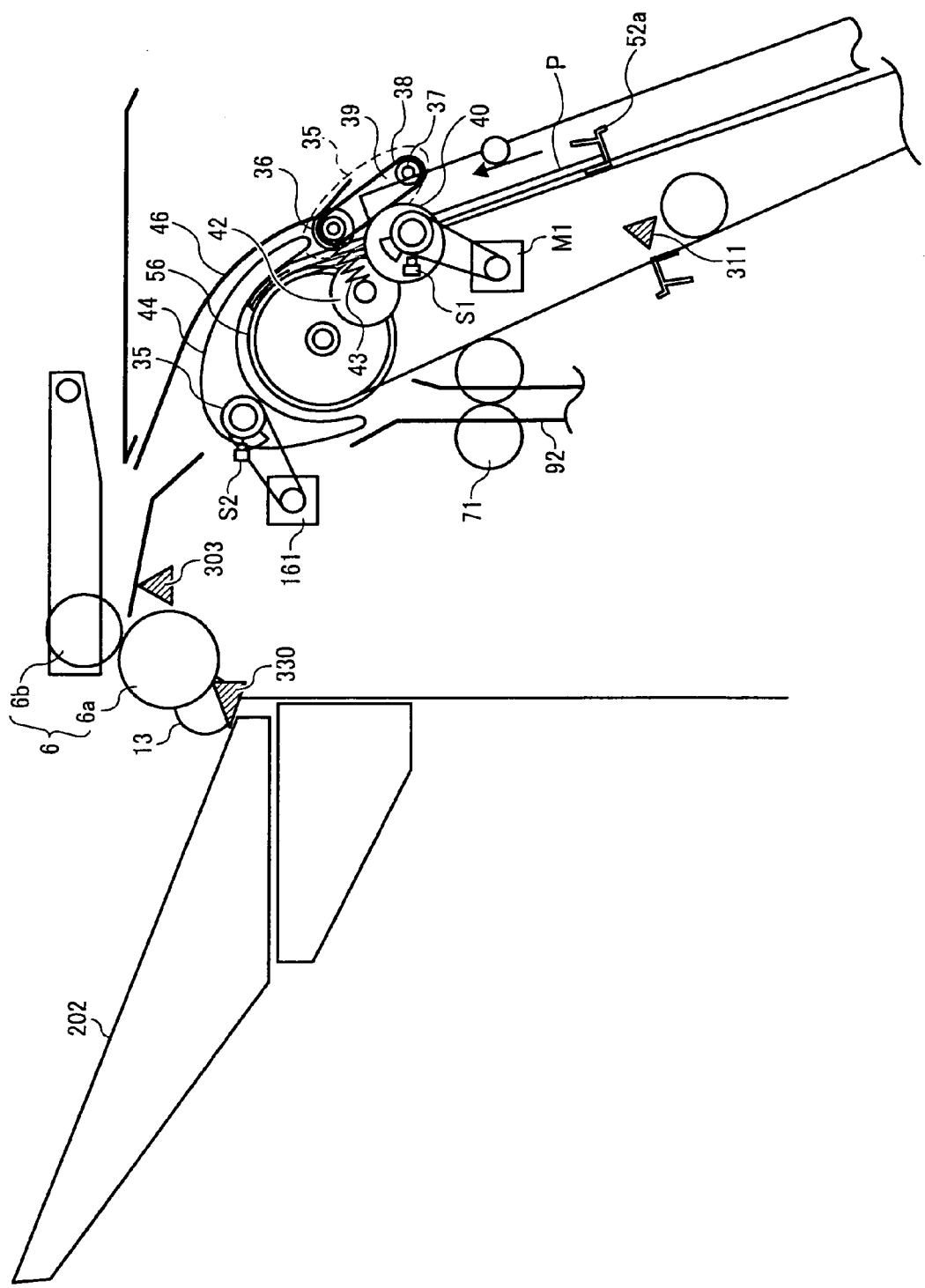
FIG. 19 is a schematic diagram for illustrating a state where a sheet bundle is being transported to a folding unit.

FIG. 19 depicts a state where a sheet bundle is being transported to the folding unit G.

Figure 20:
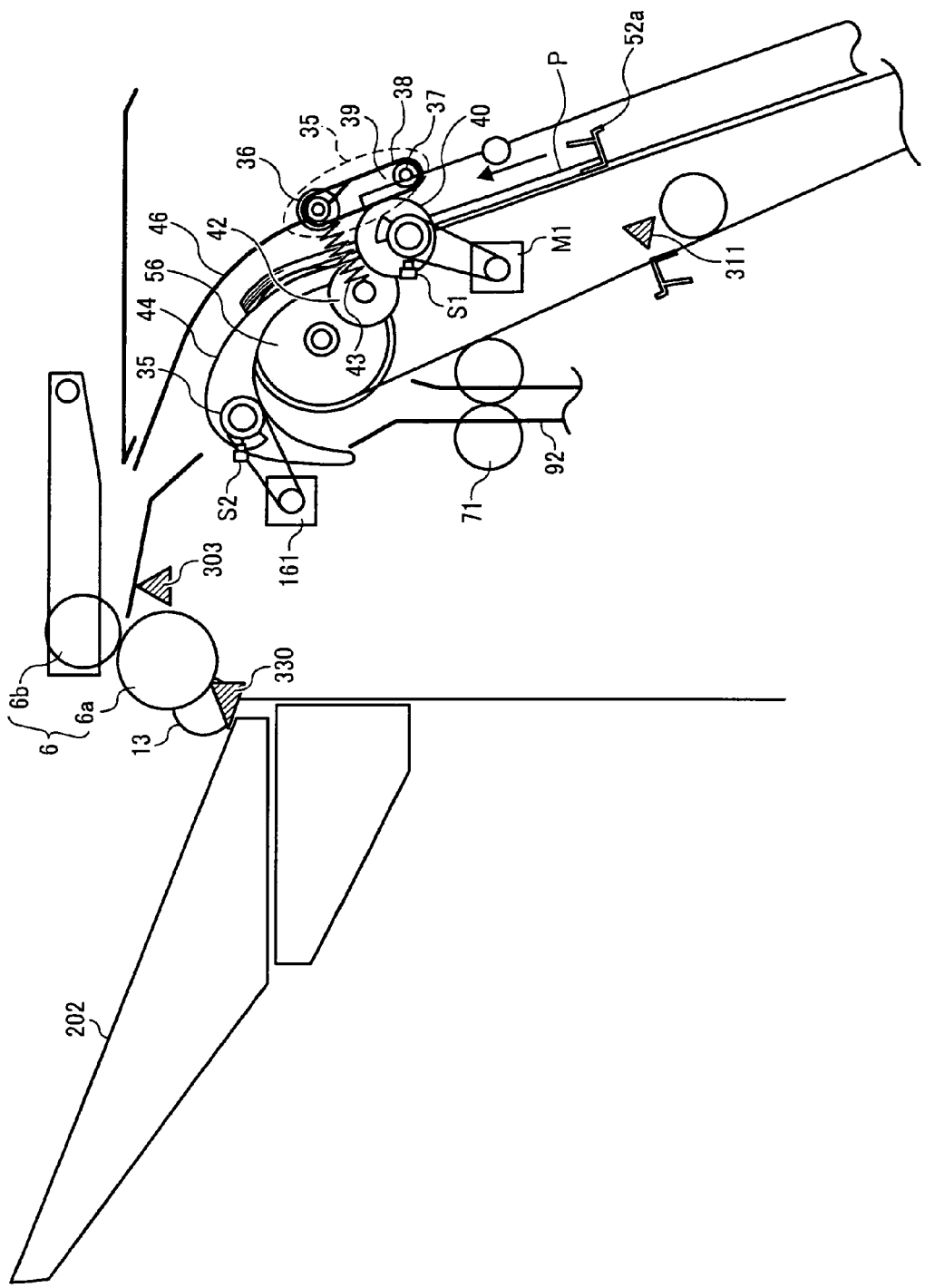
FIG. 20 is a schematic diagram for illustrating a state where a sheet bundle is being transported to a shift tray.

FIG. 20 depicts a state where a sheet bundle is being transported to the shift tray 202.

After the leading end of the sheet bundle has passed through the roller 36 of the conveyer 35 as shown in FIG. 19, the roller 36 is brought into contact with a surface of the sheet bundle, thereby imparting a moving force thereto. At this time, the guide member 44 and the discharging rollers 56 define a guide that guides turning of the sheet bundle, thereby transporting the sheet bundle to the folding unit G downstream.

To convey the sheet bundle from the folding unit F to the shift tray 202, the guide member 44 is pivotally moved as shown in FIG. 20 so that the guide member 44 and the guide plate 46 define a transport passage that guides the sheet bundle to the shift tray 202. The support rib 52a pushes up the trailing edge of the sheet bundle having been aligned in the stapling unit F to the shift tray 202.

Meanwhile, the discharging rollers 56 can be either ones of motor-driving rollers and driven rollers rotated by a motion of the sheet bundle being conveyed.

Figure 21A:
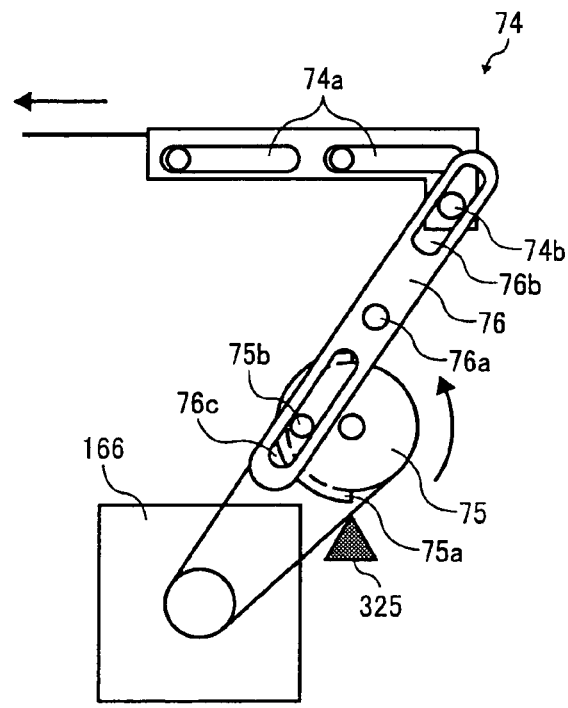
FIGS. 21A and 21B are schematic diagrams for explaining a moving mechanism of a folding plate.
Figure 21B:
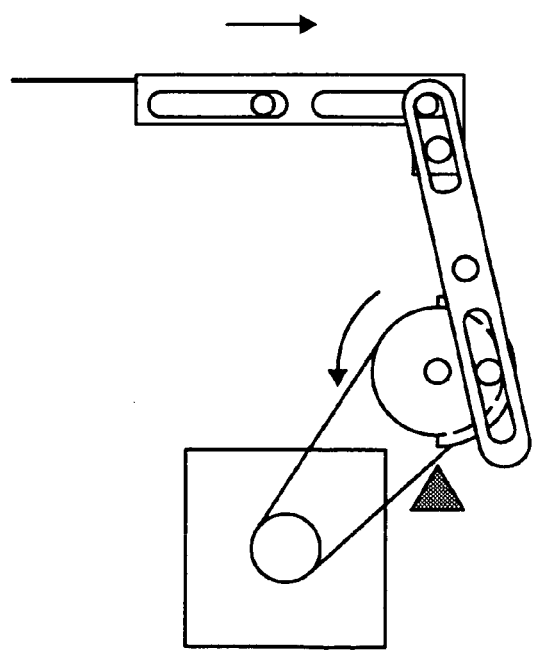

FIGS. 21A and 21B are schematic diagrams for explaining a moving mechanism of a folding plate 74. FIG. 21A depicts the folding plate 74 at a retreated position (home position). FIG. 21B depicts the folding plate 74 at an operating position (pressing-in position).

The folding plate 74 has two shafts, elongated holes 74*a*, and a shaft 74*b*. The two shafts, which are provided upright on each of the front side plate and the rear side plate, are fitted into the elongated holes 74*a*, thereby supporting the folding plate 74. The shaft 74*b* is fitted into an elongated hole 76*b* defined in a link arm 76. Hence, when the link arm 76 pivots about a pivot center 76*a*, the folding plate 74 is reciprocated in a lateral direction in FIGS. 21A and 21B. A pin 75*b* of a folding-plate driving cam 75 is fitted into an elongated hole 76*c* in the link arm 76. Hence, the link arm 76 is swung by rotation of the folding-plate driving cam 75.

A folding-plate driving motor 166 rotates the folding-plate driving cam 75 in a direction indicated by arcuate arrows in FIGS. 21A and 21B. A position at which the folding-plate driving cam 75 is to stop is determined based on detection performed by a folding-plate HP sensor 325 that detects opposite ends of a crescentic shielding portion 75*a*.

In FIG. 21A, the folding plate 74 is at the home position, at which the folding plate 74 is completely retreated from a sheet-contained area of the folding unit G. When the folding-plate driving cam 75 is rotated in the direction indicated by the arcuate arrow from this position, the folding plate 74 is moved in a direction indicated by a linear arrow in FIG. 21A to project into the sheet-contained area of the folding unit G.

In FIG. 21B, the folding plate 74 is positioned to push a center of a sheet bundle in the folding unit G into a nip of folding rollers 81. When the folding-plate driving cam 75 is rotated in the direction indicated by the arcuate arrow from this position, the folding plate 74 is moved in a direction indicated by a linear arrow in FIG. 21B, thereby retreating from the sheet-contained area of the folding unit G.

In the example configuration, one of modes listed below is performed in accordance with a specified finishing operation:

[1] Non-stapling mode "a" for discharging a sheet bundle to the upper tray 201 via the transport paths A and B;

[2] Non-stapling mode "b" for discharging a sheet bundle to the shift tray 202 via the transport paths A and C;

[3] Sorting-and-stacking mode for discharging a sheet bundle to the shift tray 202 via the transport paths A and C, in which the shift tray 202 swings in a direction perpendicular to the sheet discharging direction for each interval of sets of sheets, thereby assorting the sheets;

[4] Stapling mode for aligning and stapling a sheet bundle in the stapling unit F via the transport paths A and D, and discharging the sheet bundle to the shift tray 202 via the transport path C; and

[5] Saddle-stitching-and-booklet-making mode for aligning and saddle-stitching a sheet bundle in the stapling unit F through the transport paths A and D, folding the stapled sheet bundle into two in the folding unit G, and discharging the sheet bundle to the lower tray 203 via the transport path H.

Operations performed in [1] Non-stapling mode "a" will be described below.

After being guided from the transport path A to the transport path B by the path-switching flap 15, a sheet bundle is discharged onto the upper tray 201 by transport rollers 3 and upper exit rollers 4. An upper exit sensor 302, which is provided near the upper exit rollers 4 to detect exit of a sheet, monitors exit of sheets.

Operations performed in [2] Non-stapling mode "b" will be described below.

After being guided from the transport path A to the transport path C by the path-switching flaps 15 and 16, a sheet bundle is discharged onto the shift tray 202 by transport rollers 5 and the exit-to-shift-tray rollers 6.

The exit-to-shift-tray sensor 303, which is provided near the exit-to-shift-tray rollers 6 to detect exit of a sheet, monitors exit of sheets.

Operations performed in [3] Sorting-and-staking mode will be described below.

A sheet bundle is transported and discharged as in [2] Non-stapling mode "b".

When the sheet bundle is discharged, the shift tray 202 swings in the direction perpendicular to the sheet discharging direction for each interval of sets of sheets, thereby assorting the sheets.

Operations performed in [4] Stapling mode will be described below.

After being guided from the transport path A to the transport path D by the path-switching flaps 15 and 16, a sheet bundle is discharged onto the stapling unit F by the transport rollers 7, 9, and 10, and the exit-to-stapler rollers 11. The stapling unit F receives sheets sequentially discharged by the exit-to-stapler rollers 11 and aligns the sheets. When the number of sheets stacked in the stapling unit F reaches a predetermined value, the edge-stitch stapler S1 staples the sheet bundle. Thereafter, the thus-stapled sheet bundle is transported downstream by the support rib 52*a*, and discharged onto the shift tray 202 by the exit-to-shift-tray rollers 6. The exit-to-shift-tray sensor 303, which is provided near the exit-to-shift-tray rollers 6 to detect exit of a sheet, monitors exit of sheets.

Operations performed by the stapling unit F in [5] Stapling mode will be described.

When [5] Stapling mode is selected, as shown in FIG. 5, each of the jogger fences 53 is moved from a home position thereof to a standby position approximately 7 millimeters away from a corresponding one of side edges of a sheet to be discharged into the stapling unit F. When the trailing edge of the sheet, which is transported by the exit-to-stapler rollers 11, passes by the exit-to-stapler sensor 305, the jogger fences 53 move inward in the sheet width direction by 5 millimeters from the standby positions.

When the exit-to-stapler sensor 305 detects the trailing edge of the sheet, the exit-to-stapler sensor 305 sends a detection signal to a central processing unit (CPU) 360 (see FIG. 25, which will be described later). When the CPU 360 receives the detection signal, the CPU 360 starts counting of input pulses transmitted from a stapler conveying motor 155 (not shown) that drives the exit-to-stapler rollers 11. When the count of the input pulses reaches a predetermined value, the CPU 360 turns on the tapping SOL 170. As the tapping SOL 170 is switched on-and-off, a pendular motion is imparted to the tapping roller 12. More specifically, when the tapping SOL 170 is switched on, the tapping roller 12 taps on a sheet to cause the sheet to move back downward and abut the rear end fence 51 to attain sheet alignment. Each time the inlet sensor 301 or the exit-to-stapler sensor 305 detects passage of a sheet during this operation, the detected one of the inlet sensor 301 and exit-to-stapler sensor 305 sends a detection signal to the CPU 360, which counts the number of sheets based on the signals.

When a predetermined time elapses after the tapping SOL 170 is switched off, the jogger motors 158 further move the jogger fences 53 by 2.6 millimeters inward in the sheet width direction, thereby completing lateral alignment. The jogger fences 53 are thereafter moved outward in the sheet width direction by 7.6 millimeters to return to the standby position for a subsequent sheet. This procedure is repeated until a last sheet of the present job has been aligned. Thereafter, the jogger fences 53 are again moved inward by 7 millimeters and stopped to retain the sheet bundle at opposite side ends thereof to prepare for stapling. After a lapse of a predetermined time, the edge-stitch stapler S1 is actuated by a stapler motor (not shown) to staple the sheet bundle. When stapling at two or more positions is specified, after the sheet bundle is stapled at a first stapling position, the stapler moving motor 159 is actuated to move the end-stitch stapler S1 along the trailing edge of the sheet bundle to an appropriate position to perform stapling at a second stapling position. When stapling at three or more positions is specified, this procedure will be repeated.

After stapling has been completed, the discharging motor 157 is actuated to rotate the discharging belt 52. Simultaneously, a sheet discharging motor is also actuated to rotate the exit-to-shift-tray rollers 6 to nip the sheet bundle lifted up by the support rib 52a therebetween. At this time, the jogger fences 53 are controlled differently to accommodate variations in sheet size and the number of the sheets to be stapled. For example, when the number of sheets to be stapled is smaller than a preset number or when the sheet size is smaller than a preset size, while the support rib 52a catches a trailing edge of the sheet bundle and transports the sheet bundle while the jogger fences 53 retain the sheet bundle.

When a count of input pulses reaches a predetermined number, after the support rib 52a is detected by a sheet detecting sensor 310 or the discharging-belt HP sensor 311, the jogger fences 53 are retreated by 2 millimeters, thereby releasing restraint on the sheet bundle by the jogger fences 53. This predetermined number of pulses is set to such a value that allows the jogger fences 53 to retreat not earlier than a contact between the support rib 52a and the trailing edge of the sheet bundle and not later than passage of the support rib 52a through leading ends of the jogger fences 53.

When the number of sheets to be stapled is greater than a preset number or when the sheet size is larger than a preset size, the jogger fences 53 are retreated by 2 millimeters in advance, thereby releasing restraint. In either case, when the sheet bundle has passed through the jogger fences 53, the jogger fences 53 are moved further outward by 5 millimeters in the sheet width direction back to the standby positions for a subsequent job. The restraint force applied to the sheet bundle by the jogger fences 53 can be adjusted by changing a distance of the jogger fences 53 relative to the sheet stack.

Operations performed in [5] Saddle-stitching-and-booklet-making mode will be described below.

Figure 22D:
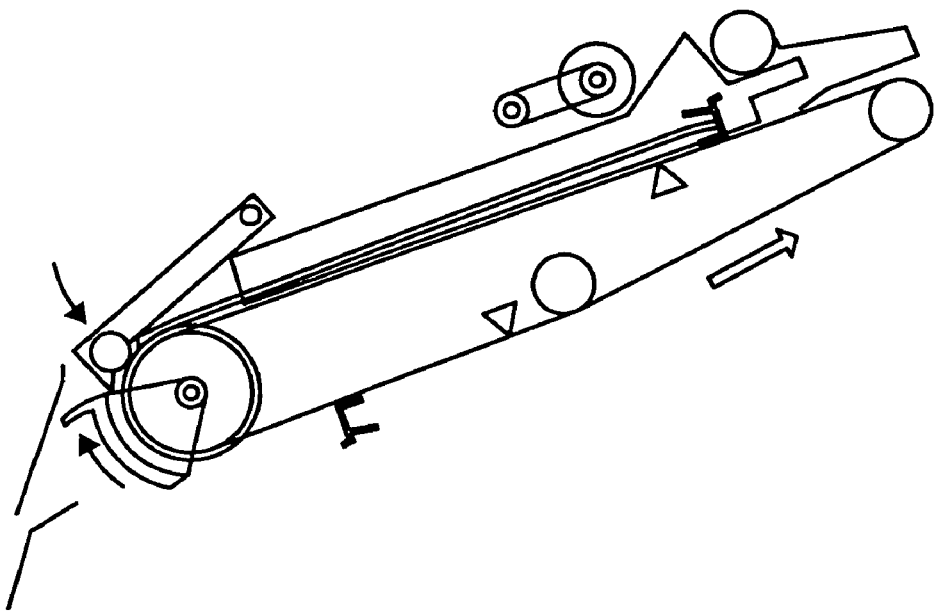
Figure 22C:
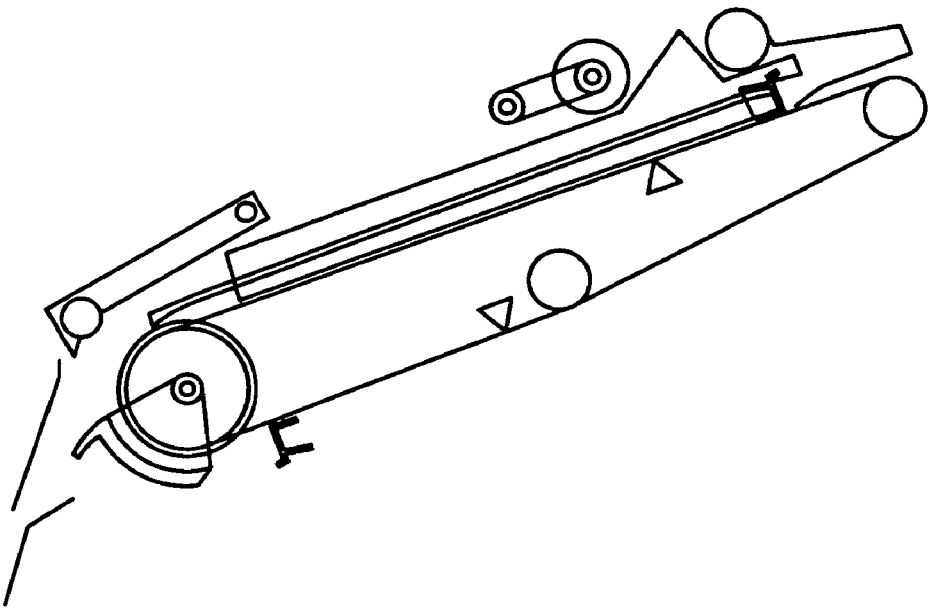

FIGS. 22A to 22D are schematic diagrams for explaining a procedure from alignment of a sheet bundle to sending out of the same. FIG. 22A depicts the stapling unit F and the folding unit G. FIG. 22B depicts a state where a sheet bundle has been aligned. FIG. 22C depicts a state where sending out of a sheet bundle is just started. FIG. 22D depicts a state where a sheet bundle is being sent out.

In FIGS. 22A to 22D, reference numeral 54 denotes a path-switching guide plate, 55 denotes a movable guide, and 57 denotes a pressure roller.

After being guided from the transport path A to the transport path D by the path-switching flaps 15 and 16, a sheet bundle is discharged onto the stapling unit F by the transport rollers 7, 9, 10, and the exit-to-stapler rollers 11. In the stapling unit F, sheets sequentially discharged by the exit-to-stapler rollers 11 are aligned as in [4] Stapling mode. This procedure is repeated until stapling is started (see FIG. 22B).

After the sheet bundle is thus temporarily aligned by the stapling unit F, the discharging rollers 56 and the pressure roller 57 nip a leading end of the sheet bundle therebetween as shown in FIG. 22D. The path-switching guide plate 54 and the movable guide 55 pivot to define a passage that guides the sheet bundle to the folding unit G. The nipped sheet bundle is transported by the support rib 52a and the discharging rollers 56 downstream again through the passage. The discharging rollers 56 are provided on the driving shaft of the discharging belt 52, and driven in synchronization with the discharging belt 52.

Figure 23C:
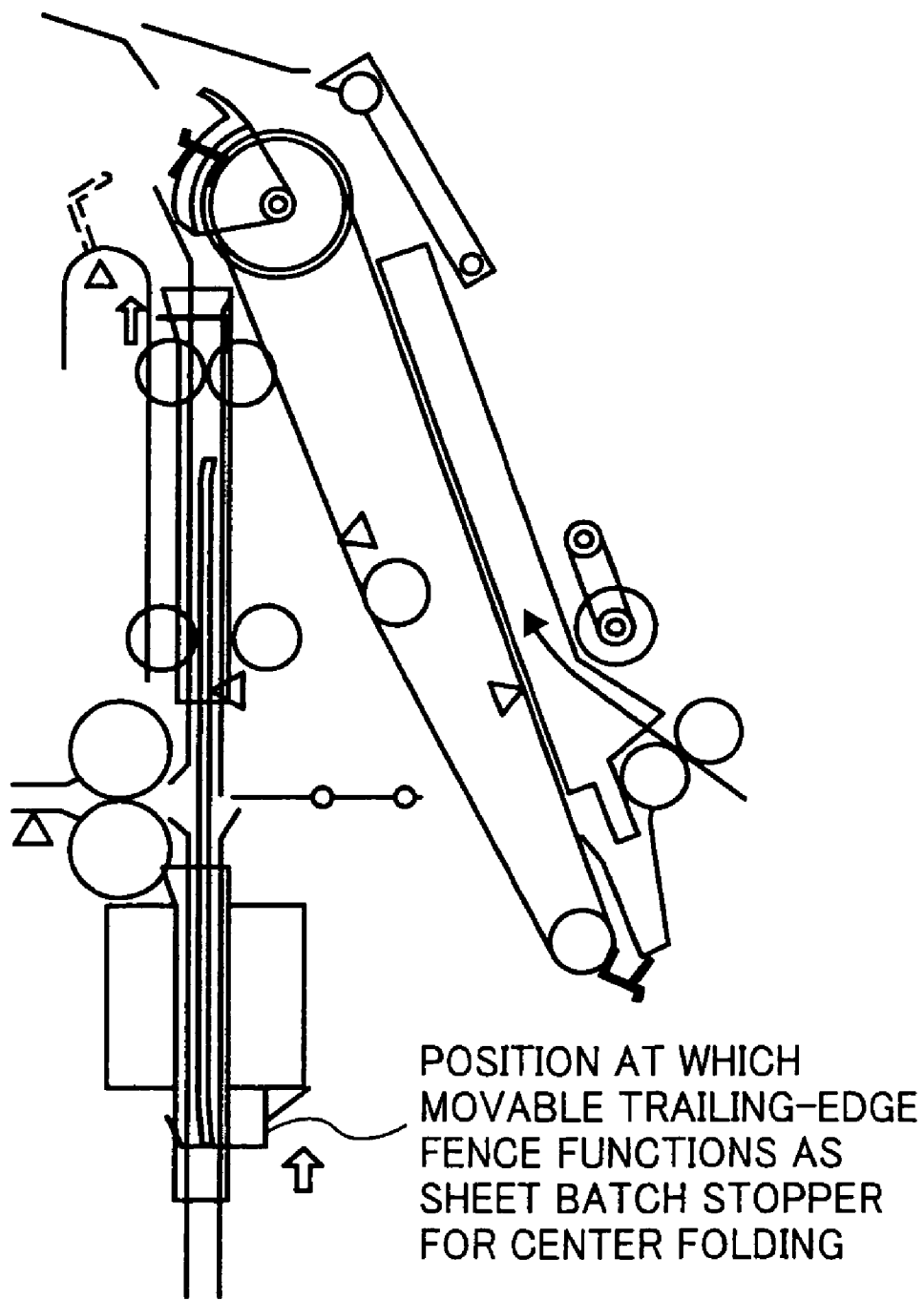

FIGS. 23A to 23C are schematic diagrams for explaining motions of the sheet bundle in the folding unit G. FIG. 23A depicts a state where the sheet bundle is completely accommodated in the folding unit G. FIG. 23B depicts a state where the sheet bundle is positioned for saddle-stitching. FIG. 23C depicts a state where the sheet bundle is positioned for center folding.

In FIGS. 23A to 23C, reference numeral 71 denotes upper batch-transport rollers, 72 denotes lower batch-transport rollers, 73 denotes a movable-trailing-edge fence (functioning as a sheet bundle stopper), 74 denotes the folding plate, 250 denotes saddle-stitch jogger fences (more specifically, an upper saddle-stitch jogger fence 250a and a lower saddle-stitch jogger fence 250b), 251 denotes a trailing-edge tapping rib, and 326 denotes a trailing-edge-tapping-rib HP sensor.

The support rib 52a transports the sheet bundle until the trailing edge of the sheet bundle passes through the discharging rollers 56. Thereafter, the upper batch-transport rollers 71 and the lower batch-transport rollers 72 transport the sheet bundle to a position shown in FIG. 23A. At this time, the movable trailing-edge fence 73 is on standby at a position that varies depending on a size of the sheet bundle in the sheet transport direction. When a leading edge of the sheet bundle comes into contact with the movable trailing-edge fence 73, which is on standby, to be stacked thereon, as shown in FIG. 23B, a pressure applied from the lower batch-transport rollers 72 onto the sheet bundle is released. Subsequently, the trailing-edge tapping rib 251 taps on the trailing edge of the sheet bundle, thereby performing final alignment of the sheet bundle in the sheet transport direction. The reason for performing the final alignment is as follows. The sheet bundle is temporarily aligned in the stapling unit F, however, the sheet bundle can go out of alignment during the process performed before the sheet bundle is stacked on the movable trailing-edge fence 73. Accordingly, it is necessary to perform the final alignment with the trailing-edge tapping rib 251.

Immediately thereafter, the upper center-stitch jogger fence 250a and the lower center-stitch jogger fence 250b perform final alignment in the sheet width direction of the sheet bundle. Thereafter, the center-stitch stapler S2 staples the sheet bundle at a center thereof.

Positioning of the movable trailing-edge fence 73 is performed by controlling pulses based on a detection signal supplied from a movable-trailing-edge-fence HP sensor 322. Positioning of the trailing-edge tapping rib 251 is performed by controlling pulses based on a detection signal supplied from the trailing-edge-tapping-rib HP sensor 326.

As shown in FIG. 23C, the saddle-stitched sheet bundle is transported upward, with the pressure applied from the lower batch-transport rollers 72 remaining released, following a motion of the movable trailing-edge fence 73.

Figure 24A:
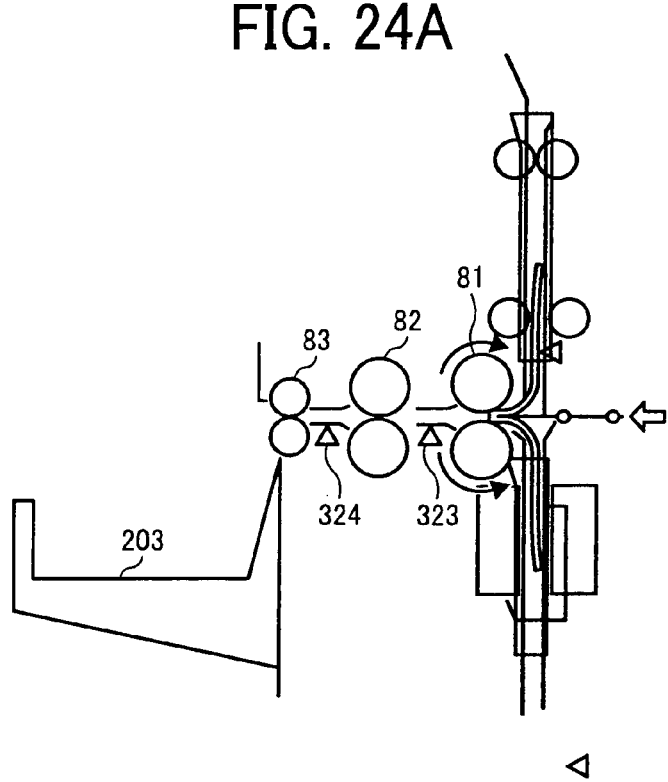
FIGS. 24A and 24B are schematic diagrams for explaining a procedure of center folding.
Figure 24B:
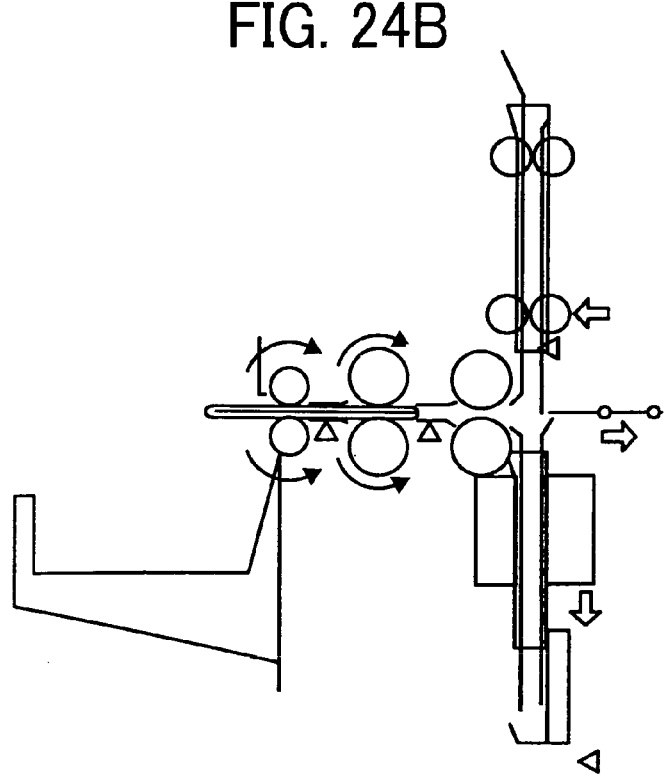

FIGS. 24A and 24B are schematic diagrams for explaining a procedure of center folding.

FIG. 24A depicts a state where center folding has just started. FIG. 24B depicts a state where center folding has been completed.

In FIGS. 24A and 24B, reference numeral 81 denotes the folding rollers, 82 denotes second folding rollers, 83 denotes lower discharging rollers, and 323 denotes a folding-unit-exit sensor.

As shown in FIG. 24A, the folding plate 74 pushes the stapled sheet bundle at a portion near the stapled area in a direction generally perpendicular to the sheet surface, thereby guiding the sheet bundle to a nip of the folding rollers 81 that face the folding plate 74. The folding rollers 81 having been rotated in advance convey the sheet bundle while pressing the same, thereby folding the sheet bundle into two along a center line.

Meanwhile, moving the saddle-stitched sheet bundle upward for the folding operation allows to convey the sheet bundle without fail only by moving the movable trailing-edge fence 73. If the sheet bundle is moved downward instead of upward for the folding operation, it becomes uncertain whether the sheet bundle can be conveyed only by moving the movable trailing-edge fence 73. Hence, this configuration requires another means for conveying the sheet bundle, making the configuration undesirably complicated.

As shown in FIG. 24B, the folded sheet bundle is nipped by the second folding rollers 82 to be folded more closely, and discharged onto the lower tray 203 by the lower discharging rollers 83. At this time, when the folding-unit-exit sensor 323 detects the trailing edge of the sheet bundle, the folding plate 74 and the movable trailing-edge fence 73 return to the corresponding home positions, and the lower batch-transport rollers 72 resumes pressure application as preparation for a subsequent job. When the subsequent job contains sheets of the same size and same number of sheets as the current job, the movable trailing-edge fence 73 can return to the position shown in FIG. 23A to be on standby for the job.

Figure 25:
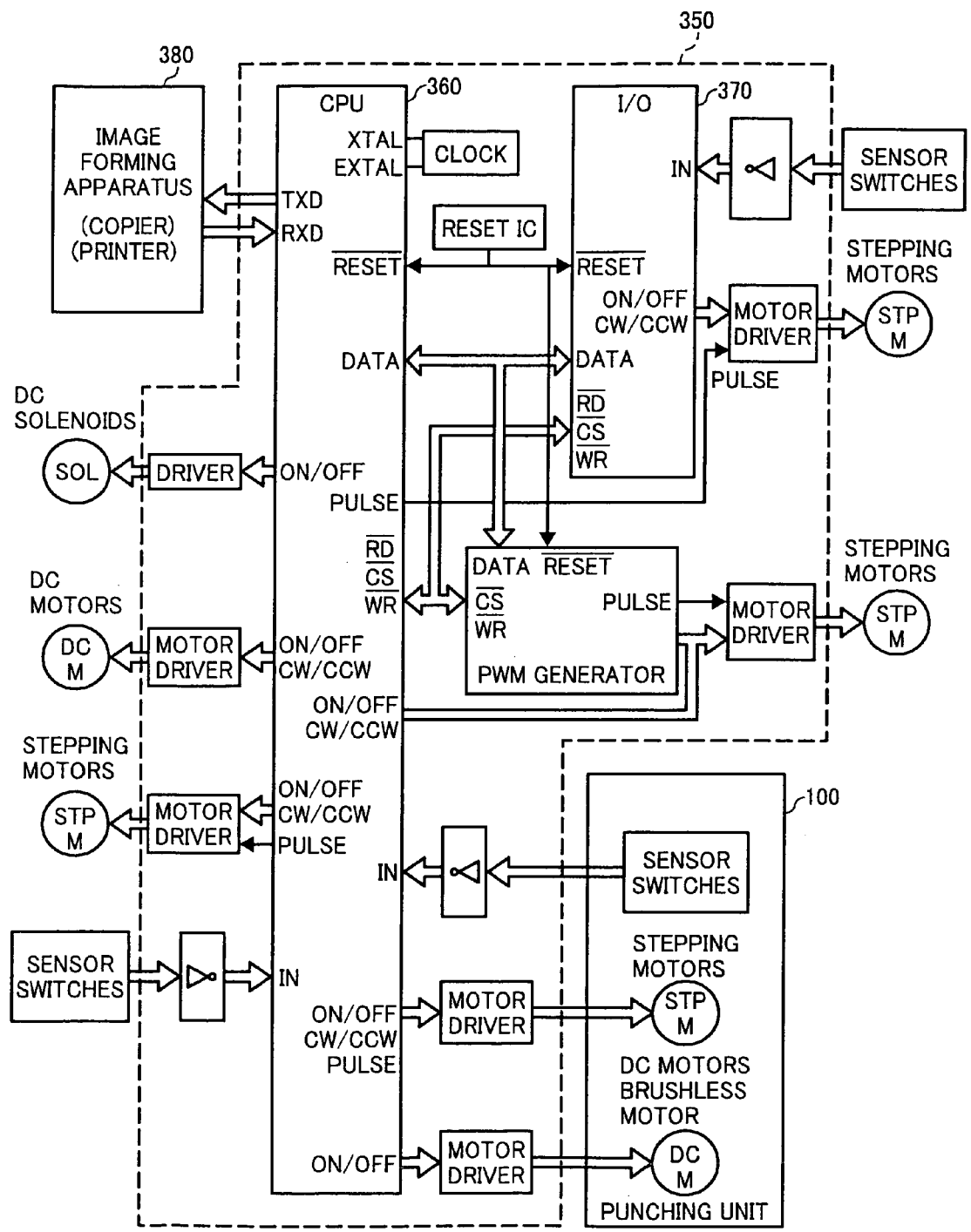
FIG. 25 is a block diagram for explaining a controller.
Figure 26A:
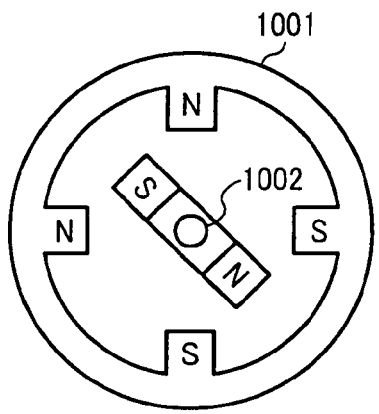
FIGS. 26A to 26D are schematic diagrams for explaining the principles of a stepping motor.
Figure 26B:
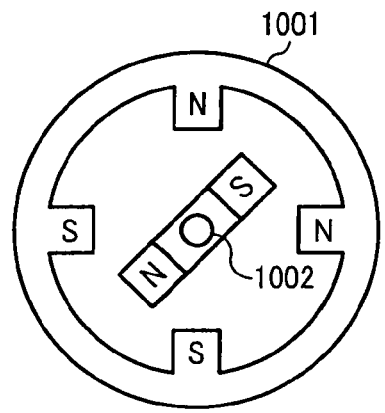
Figure 26D:
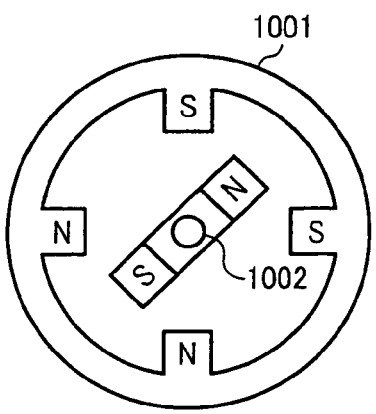
Figure 26C:
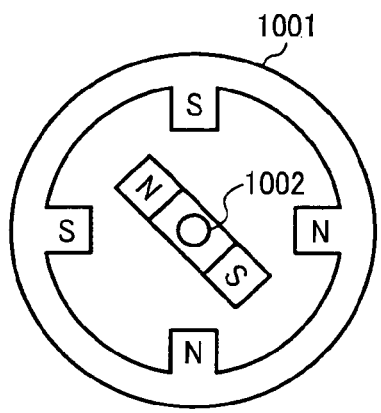

FIG. 25 is a block diagram for explaining the controller 350.

In FIG. 25, reference numeral 350 denotes the controller, 360 denotes the CPU, and 370 denotes an input/output (I/O) interface.

As shown in FIG. 25, the controller 350 is a microcomputer that has the CPU 360, the I/O interface 370, and the like. The CPU 360 receives signals from switches on a control panel (not shown) of the image forming apparatus and various sensors such as the sheet level sensor 330 via the I/O interface 370. Based on the thus-input signals, the CPU 360 controls actuation of the following: the tray elevating motor 168 for the shift tray 202; the sheet-exit-guide-plate opening/closing motor 167 that opens and closes the opening/closing guide plate; the shift motor 169 that moves the shift tray 202; the tapping roller motor 156 that drives the tapping roller 12; solenoids such as the tapping SOL 170; transport motors that drive the transport rollers; sheet discharging motors that drive the sheet discharging rollers; the discharging motor 157 that rotates the discharging belt 52; the stapler moving motor 159 that moves the edge-stitch stapler S1; a tilt motor 160 that tilts the edge-stitch stapler S1; the jogger motors 158 that move the jogger fences 53; the path-switching motor 161 that pivots the guide member 44; batch-transport motors 162 that drives transport rollers that convey a sheet bundle; a trailing-edge-fence moving motor 163 that moves the movable trailing-edge fence 73; the folding-plate driving motor 166 that moves the folding plate 74; a folding-roller driving motor 164 that drives the folding rollers 81; and the like. The CPU 360 receives pulse signals from the stapler conveying motor 155 (not shown) that drives the exit-to-stapler rollers 11, counts the signals, and controls the tapping SOL 170 and the jogger motors 158 according to the count.

Because the tray elevating motor 168 requires a larger torque than other above-listed motors, a DC motor is generally used as the tray elevating motor 168. However, a stepping motor is applicable to any other one of the motors.

Disadvantages of stepping motors will be described with reference to FIGS. 26A to 28.

FIGS. 26A to 26D are schematic diagrams for explaining the principle of stepping motors. Each of FIGS. 26A to 26D depicts a positional relationship between an excitation pattern and a rotor 1002 of an exemplary stepping motor.

In FIGS. 26A to 26D, reference numeral 1001 denotes a stator, 1002 denotes the rotor, and N and S denote magnetic poles.

Figure 27:
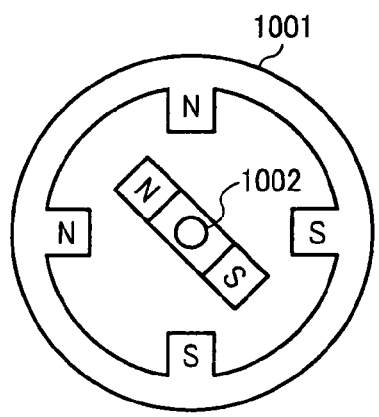
FIG. 27 is a schematic diagram for explaining a positional relationship between an excitation pattern and a rotor out of phase in an exemplary stepping motor.

FIG. 27 is a schematic diagram for explaining a positional relationship between an excitation pattern and a rotor out of phase in the exemplary stepping motor.

Figure 28:
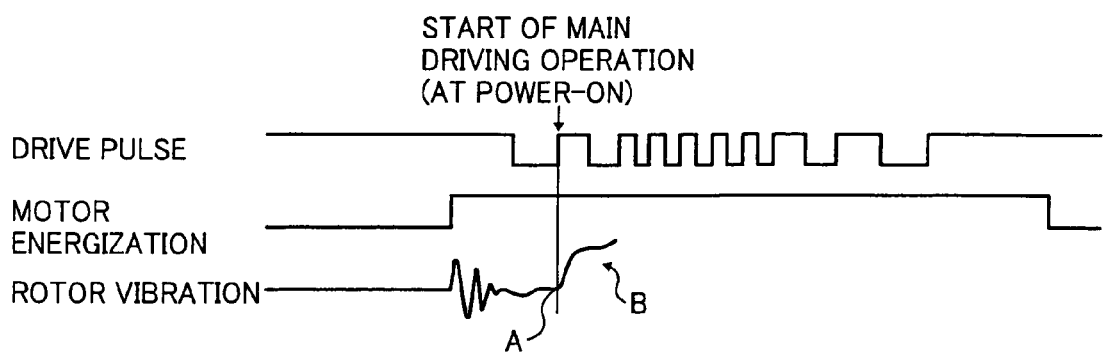
FIG. 28 is a timing chart related to driving of the stepping motor.

FIG. 28 is a timing chart related to driving of the stepping motor.

The exemplary stepping motor shown in FIGS. 26A to 26D is rotated in a step angle of 90 degrees in two-phase excitation patterns. A step angle of the motor to be actually employed in the sheet finisher is smaller than that of the exemplary stepping motor. However, because the motor to be actually employed is identical to the exemplary stepping motor in principle of operation, the exemplary stepping motor will be described below. The rotor 1002 is stabilized at each of positions shown in FIGS. 26A to 26D which depict different excitation patterns. When the phase matching operation is performed before motor actuation, the position, at which the rotor 1002 is stabilized and stopped, is similarly determined by an excitation pattern. Therefore, when the motor is energized for a predetermined time in one of the excitation patterns, the rotor 1002 is generally moved to one of the positions shown in FIGS. 26A to 26D, thereby attaining phase matching of the rotor 1002.

However, as shown in FIG. 27, there are some cases that, even when the motor is energized in one of the excitation patterns, the rotor 1002 fails to move to a corresponding one of the positions shown in FIGS. 26A to 26D. FIG. 27 depicts the same excitation pattern as that shown in FIG. 26A, however, the rotor 1002 in FIG. 27 is rotated by 180 degrees from that shown in FIG. 26A. Because the magnetic polarity of the rotor 1002 and that of the stator 1001 repel to each other in this state, the rotor 1002 does not stop at this position, in principle. To rotate the rotor 1002 by 180 degrees from this position, causing the rotor 1002 to start rotation in either clockwise or counterclockwise is required. However, when the rotor 1002 is inversely positioned by exactly 180 degrees, no magnetic force acts on any one of the directions, eventually bringing the rotor 1002 into a balanced state. When the rotor 1002 is rotated, even only slightly, clockwise or counterclockwise, a force acts to rotate the rotor 1002 in the rotated direction, thereby moving the rotor 1002 to the stable state shown in FIG. 26A, in which the rotor 1002 is rotated by 180 degrees from the inverse position.

Figure 29:
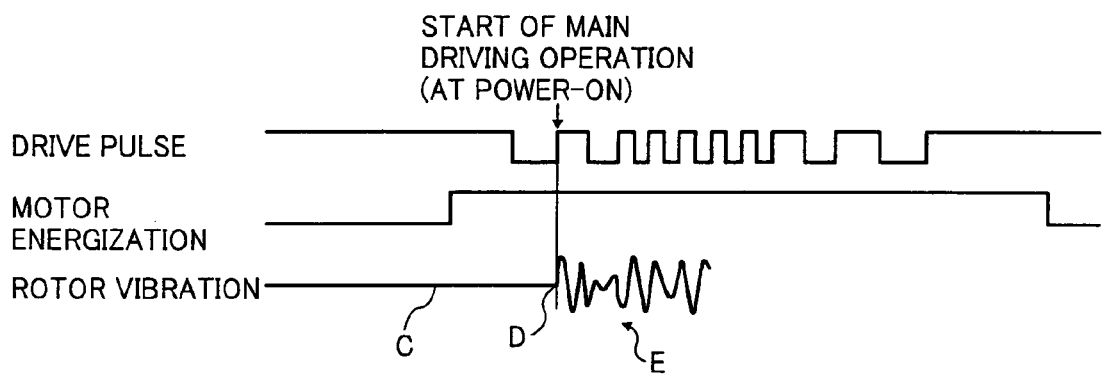
FIG. 29 is a timing chart of a state where the rotor is in an inverse position.

FIG. 29 is a timing chart of a state where the rotor 1002 is in the inverse position.

As described above, there are occasional cases that phase matching cannot be attained only by energizing the motor in one of the excitation patterns. When the stepping motor is actuated from this state, the rotor 1002 can fail to follow phases indicated by phase signals, resulting in step out as shown in FIG. 27.

Figure 30:
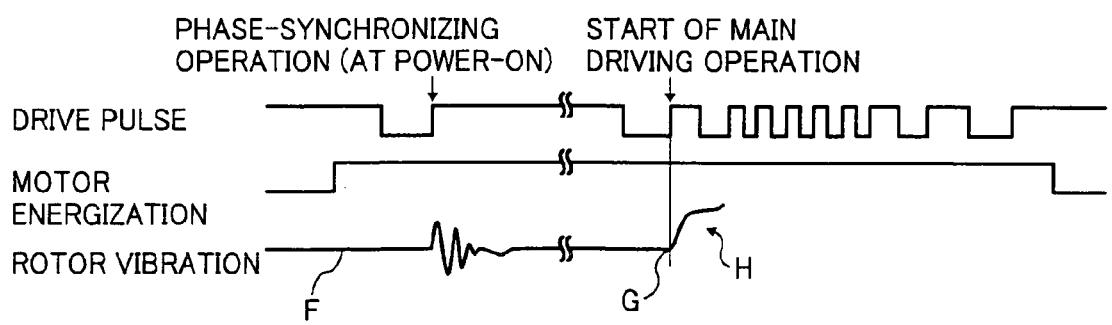
FIG. 30 is a timing chart pertaining to a first embodiment of the present invention.

FIG. 30 is a timing chart pertaining to a first embodiment of the present invention.

Figure 31:
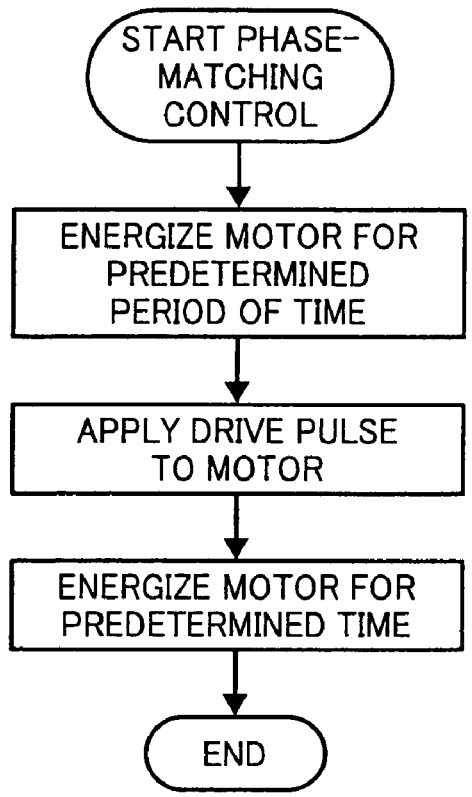
FIG. 31 is a flowchart of a motor driving procedure according to the first embodiment.

FIG. 31 is a flowchart of a motor driving procedure according to the first embodiment.

According to the first embodiment, even when phase matching is not attained by energizing a motor for a predetermined time, one or more drive pulses, a final pulse of which energizes the motor for a predetermined duration with a phase signal sustained, are applied to the motor.

This operation allows to attain the phase matching without fail. This phase matching operation can be performed when there is a possibility of being out of phase. Hence, occurrence of step out can be prevented by advancing the phase by a degree corresponding to at least one pulse immediately before actuation of the motor and energizing the motor for a duration, over which phase matching of the rotor 1002 is attained and vibration of the rotor 1002 subsides. The duration, over which vibration subsides, varies depending on a load applied to a motor to be employed and inertia of the same. A typical example duration is several tens of milliseconds or so.

Note that when this operation is adopted, the motor requires a longer time to start driving. This can cause the motor, a quick start-up of which is required, to fail to start driving in time.

When the motor is driven in the direction opposite to a direction, in which the motor is driven in the phase matching operation according to the first embodiment, a load can fluctuate due to backlash pertaining to such driving. When a main driving operation requires a high stepping rate, such load fluctuation is likely to result in step out of the motor.

According to a second embodiment of the present invention, in the first embodiment, the direction, in which the motor is driven for the phase matching operation, is identical with a direction, in which the motor is driven for a main driving operation subsequent thereto. More specifically, for example, when the phase matching operation according to the first embodiment energizes the motor for one pulse to shift a position of the motor from the pattern shown in FIG. 26A (hereinafter, "pattern A") to pattern B, the motor is energized for a main driving operation subsequent thereto to shift in the order of: pattern B, C, D, and A. To drive the motor in a direction opposite to that of this example for a main driving operation, the phase matching operation according to the first embodiment energizes the motor to shift from pattern A to D (when the motor is driven for one pulse), and the motor is energized for the main driving operation subsequent thereto to shift in the order of: pattern D, C, B, and A.

In the phase matching operation according to the first embodiment, the motor is driven. This is inconvenient for a main driving operation subsequent thereto when the main driving is to be started directly from a position at which the motor has been stopped before being subjected to the phase matching operation (hereinafter, "unmatched position") of the motor. When the unmatched position of the motor is a home position, the phase matching operation undesirably causes the motor to offset from the home position by an angular distance corresponding to a count of drive pulses applied in the phase matching operation.

According to a third embodiment of the present invention, in the first embodiment, after the phase matching operation is performed, the stepping motor is driven in a direction reverse to a direction, in which the stepping motor has been driven in the phase matching operation, for the same number of drive pulses as a count of the drive pulses applied in the phase matching operation, thereby restoring a phase signal to a state prior to the phase matching operation. More specifically, for example, when the motor is driven to shift from pattern A, to B, and then to A, not only phase matching can be attained without fail, but also the phase signal is restored to the state prior to the phase matching operation.

When the motor is driven in the direction opposite to the direction, in which the motor has been driven for the phase matching operation, as described above in the second embodiment, a load can fluctuate due to backlash pertaining to driving. When a main driving operation requires a high stepping rate, such load fluctuation is likely to result in step out of the motor.

According to a fourth embodiment of the present invention, in the third embodiment, a direction in which the motor is driven for the phase matching operation (the direction in which the motor is driven in reverse) is identical with a direction, in which the motor is driven for the main driving operation subsequent thereto. More specifically, for example, when the motor is driven to shift from pattern A, to B, and then to A in the phase matching operation according to the third embodiment, the motor is driven to shift in the order of: pattern A, D, C, and B in the main driving operation subsequent thereto. When the main driving operation is to be driven in a direction opposite to that of this example, the motor is driven in the phase matching operation according to the third embodiment to shift from pattern A, to D, and then to A, and driven to shift in the order of: pattern A, B, C, and D in the main driving operation subsequent thereto.

A fifth embodiment of the present invention is a sheet processing device according to any one of the first to fourth embodiments. Examples of the sheet processing device include finishers attached to an image forming apparatus. An example finisher has been described above. Because a finisher generally includes many stepping motors and is required to be capable of starting up quickly, the present invention yields great effects on finishers. According to the fifth embodiment, a finisher is assumed to include at least one stepping motor.

Figure 32:
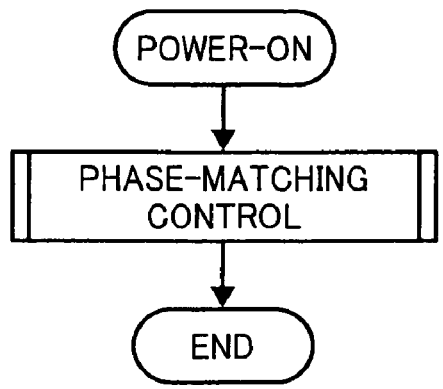
FIG. 32 is a flowchart related to a sixth embodiment of the present invention.

FIG. 32 is a flowchart related to a sixth embodiment of the present invention.

When the phase matching operation is performed immediately before the motor is actuated for a main driving operation, the motor requires a longer time to start driving. Because this can cause the motor, a quick start-up of which is required, to fail to start driving in time, the phase matching operation is preferably performed in advance when there is a possibility of being out of phase. For example, at power-on of the sheet processing device, the motor is out of phase in most cases because a phase signal is restored to an initial value thereof. When the motor goes out of phase, matching the phase as soon as possible is required. Otherwise, the sheet processing device can fail to attain both quick start-up and prevention against step-out.

According to the sixth embodiment, the phase matching operation is performed at power-on of the sheet processing device.

Figure 33:
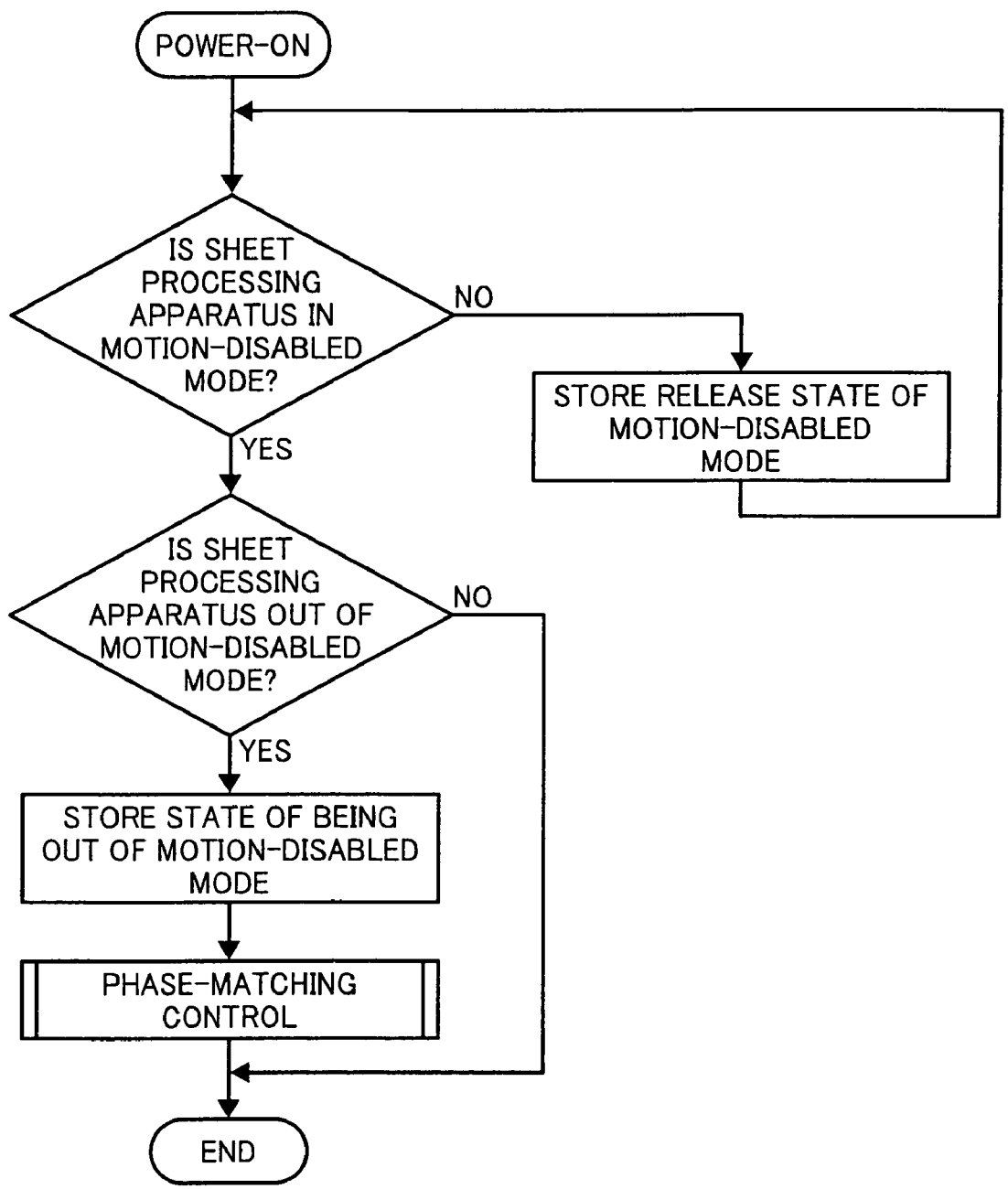
FIG. 33 is a flowchart related to a seventh embodiment of the present invention.

FIG. 33 is a flowchart related to a seventh embodiment of the present invention.

When the phase matching operation is performed immediately before the motor is actuated for a main driving operation, the motor requires a longer time to start driving. Because this can cause the motor, a quick start-up of which is required, to fail to start driving in time, the phase matching operation is preferably performed in advance when there is a possibility of being out of phase. In a motion-disabled mode, in which all motions are disabled, actuating the motor is disabled even when there is a possibility of being out of phase due to opening or closing of a door of the sheet processing device, or the like. Accordingly, there is a possibility that the motor is out of phase when the motion-disabled mode is cancelled. When the motor is thus out of phase, matching the phase as soon as possible is required. Otherwise, the sheet processing device can fail to attain both quick start-up and prevention against step-out.

According to the seventh embodiment, the sheet processing device has the motion-disabled mode that disables all motions, and the phase matching operation is performed when the motion-disabled mode is cancelled.

Figure 34:
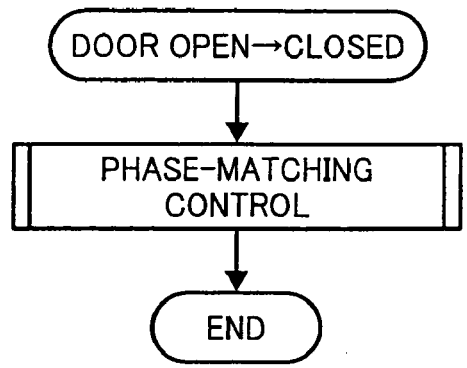
FIG. 34 is a flowchart related to an eighth embodiment of the present invention.

FIG. 34 is a flowchart related to an eighth embodiment of the present invention.

When the phase matching operation is performed immediately before the motor is actuated for a main driving operation, the motor requires a longer time to start driving. Because this can cause the motor, a quick start-up of which is required, to fail to start driving in time, the phase matching operation is preferably performed in advance when there is a possibility of being out of phase. When a door provided in the sheet processing device for an access to the interior of the sheet processing device for removal of jammed paper or the like is opened, the motor can step out due to removal of jammed paper, or the like. When the motor is out of phase, matching the phase as soon as possible is required. Otherwise, the sheet processing device can fail to attain both quick start-up and prevention against step-out.

According to the eighth embodiment, the sheet processing device has a door for an access to the interior of the sheet processing device for removal of jammed paper and the like and a detection unit that determines whether the door is open or closed. When the door is detected to be closed from an open state, the phase matching operation is performed.

Figure 35:
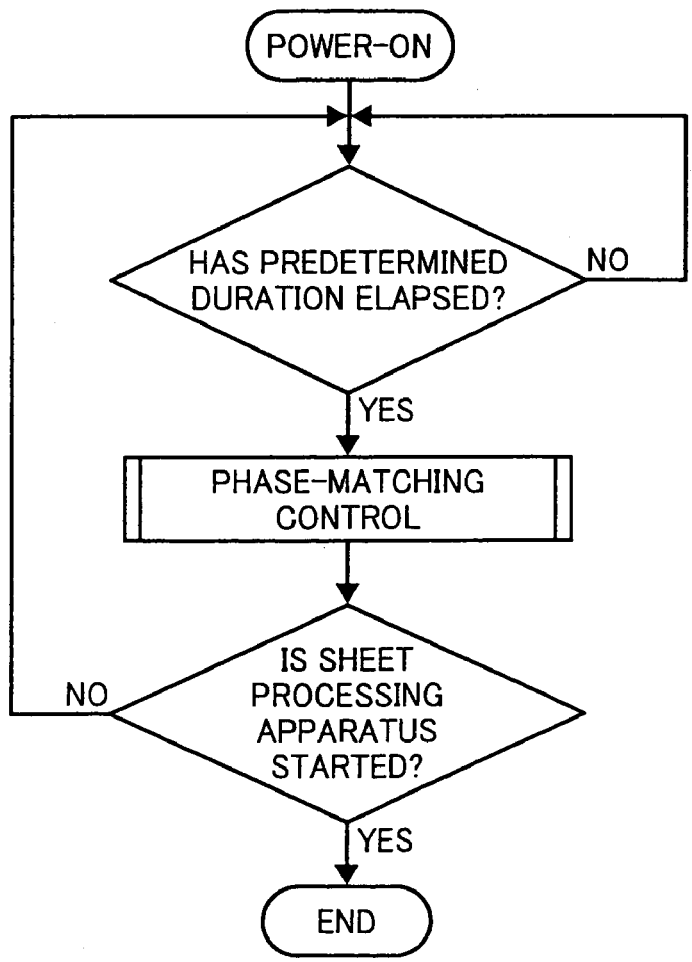
FIG. 35 is a flowchart related to a ninth embodiment of the present invention.

FIG. 35 is a flowchart related to a ninth embodiment of the present invention.

When the phase matching operation is performed immediately before the motor is actuated for a main driving operation, the motor requires a longer time to start driving. Because this can cause the motor, a quick start-up of which is required, to fail to start driving in time, the phase matching operation is preferably performed in advance when there is a possibility of being out of phase. The occasions, at which the motor is likely to lose the phase matching, have been described by taking the occasions described in the sixth to eighth embodiments as examples, however, such occasions are not limited thereto, and the motor can lose the phase matching as well during a halt of the sheet processing device. Example reasons that cause the motor to lose the phase matching include:

1) Phase shift caused by rotation of the motor due to vibrations of the sheet processing device;

2) Phase shift caused by rotation of the motor due to a tension of the timing belt, a tension of the spring; and the like. In particular, when the sheet processing device is incapable of detecting an exterior trigger for phase shift, the sixth to eight embodiments fail to solve the problem of the phase shift resulting from the above-listed causes.

According to the ninth embodiment, when the sheet processing device is during a halt, in which the sheet processing device processes no sheet, the phase matching operation is performed at fixed time intervals. The fixed time intervals can be determined by statistically calculating an average duration of a halt pertaining to a user of the sheet processing device. Alternatively, the time intervals can be set to perform the phase matching operation, for example, every 10 minutes irrespective of a usage pattern of the user.

Figure 36:
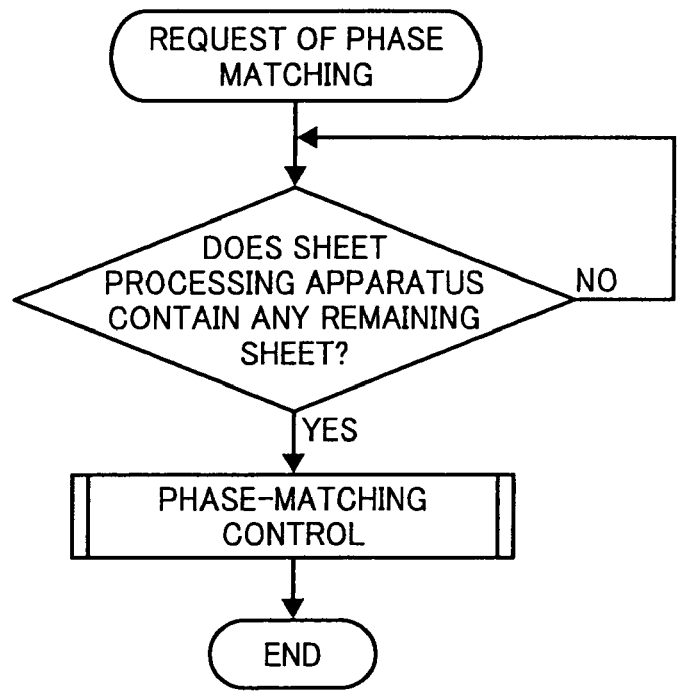
FIG. 36 is a flowchart related to a tenth embodiment of the present invention.

FIG. 36 is a flowchart related to a tenth embodiment of the present invention.

When a remaining sheet is detected inside the sheet processing device, it is necessary to perform the phase matching operation again after the sheet has been removed. Hence, the phase matching operation is preferably not performed when a sheet remains inside the apparatus. Further, when an abnormal condition is detected in mechanisms of the sheet processing device, starting sheet processing is disabled. Accordingly, the phase matching operation is not performed.

According to the tenth embodiment, the phase matching operation is performed only when the sheet processing device contains no remaining sheet.

Figure 37:
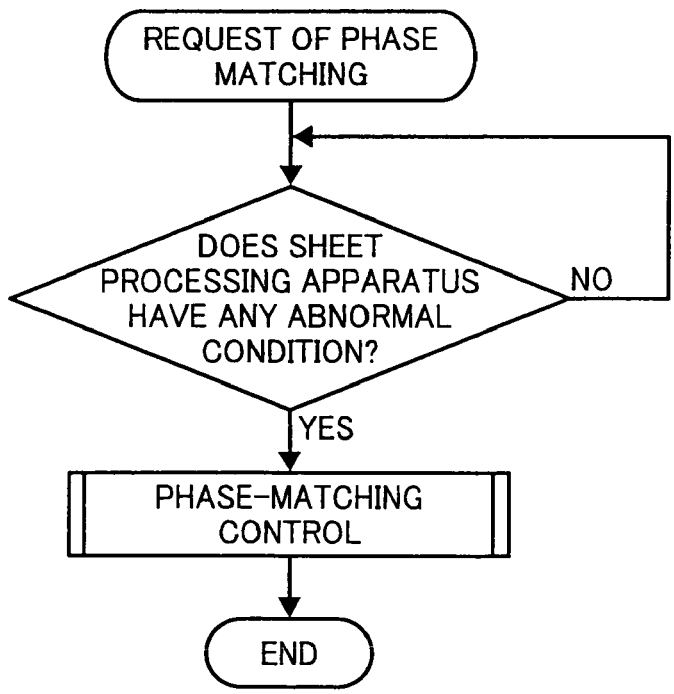
FIG. 37 is a flowchart related to an eleventh embodiment of the present invention.

FIG. 37 is a flowchart related to an eleventh embodiment of the present invention.

According to the eleventh embodiment, the phase matching operation is performed only when no abnormal condition is detected in the mechanisms.

Figure 38:
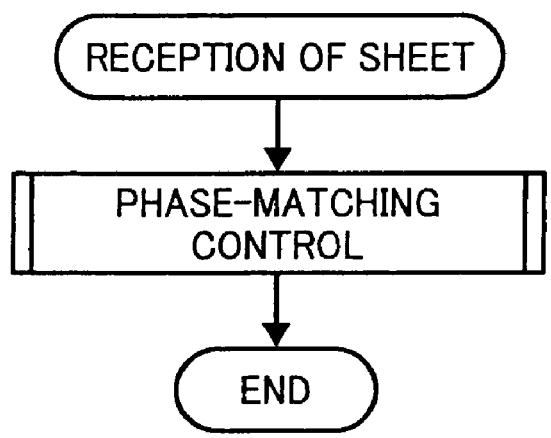
FIG. 38 is a flowchart related to a twelfth embodiment of the present invention.

FIG. 38 is a flowchart related to a twelfth embodiment of the present invention.

When the phase matching operation is performed immediately before the motor is actuated for a main driving operation, the motor requires a longer time to start driving. Because this can cause the motor, a quick start-up of which is required, to fail to start driving in time, the phase matching operation is preferably performed in advance when there is a possibility of being out of phase. When the sheet processing device has mechanisms that involve the causes having been described in the ninth embodiment for unpredictable phase shift, the phase matching operation is preferably performed immediately before a main driving operation of the motor. When the motor is driven for a long time in the phase matching operation, phase shift is likely to occur.

According to the twelfth embodiment, the phase matching operation is performed in receiving a sheet from an upstream machine.

Figure 39:
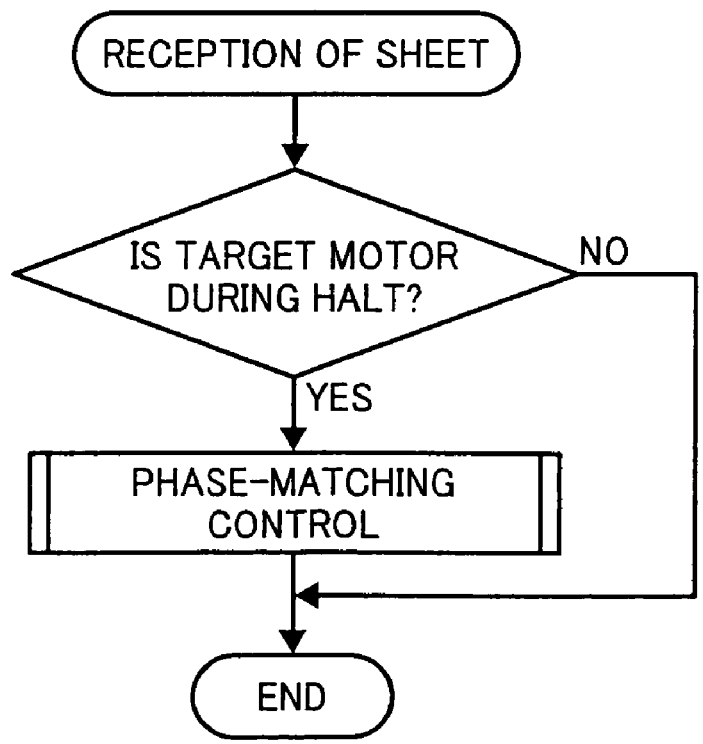
FIG. 39 is a flowchart related to a thirteenth embodiment of the present invention.

FIG. 39 is a flowchart related to a thirteenth embodiment of the present invention.

In the twelfth embodiment, the phase matching operation is performed in receiving a sheet from the upstream machine. However, the motor, which is a target of the phase matching operation, can be during a course of processing a previously-received sheet. When the motor is during the course of processing, the phase matching operation is not required. In addition, when the phase matching operation is performed during a course of processing, a problem can occur in the sheet processing.

According to the thirteenth embodiment, the phase matching operation is performed in receiving a sheet from the upstream machine only during a halt of the stepping motor.

As described above, according to an aspect of the present invention, the phase matching operation can be performed at any two or more occasions among the occasions described in the sixth to thirteenth embodiments.

Furthermore, according to another aspect of the present invention, a stepping motor driving device can perform a phase matching operation that does not inhibit a main driving operation of a stepping motor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device for driving a stepping motor according to a drive pulse of a step signal, comprising:

a phase matching unit that matches, at a time when there is a possibility that a rotor and a phase signal are out of phase with each other, phases of the rotor and the phase signal by applying at least one drive pulse after energizing the stepping motor for a predetermined time and applying a phase signal having a predetermined duration for a final pulse; and a phase signal restoring unit that drives, after the phase matching unit matches the phases, the stepping motor in a reverse driving direction for same number of drive pulses, and restores the phase signal to a state before the phase matching unit matches the phases.

2. The device according to claim 1, wherein phase matching unit matches the phases in a same direction as a direction in which the stepping motor is driven for a main driving operation.

3. The device according to claim 1, wherein the reverse driving direction is same as a direction in which the stepping motor is driven for a main driving operation.

4. A sheet processing device comprising:

a stepping motor driving device that drives a stepping motor according to a drive pulse of a step signal, the stepping motor driving device including a phase matching unit that matches, at a time when there is a possibility that a rotor and a phase signal are out of phase with each other, phases of the rotor and the phase signal by applying at least one drive pulse after energizing the stepping motor for a predetermined time and applying a phase signal having a predetermined duration for a final pulse, wherein the stepping motor driving device further includes a phase signal restoring unit that drives, after the phase matching unit matches the phases, the stepping motor in a reverse driving direction for same number of drive pulses, and restores the phase signal to a state before the phase matching unit matches the phases.

5. The sheet processing device according to claim 4, wherein the phase matching unit matches the phases at a time of turning on the sheet processing device.

6. The sheet processing device according to claim 4, wherein the phase matching unit matches the phases upon receiving a sheet from a prior stage device.

7. The sheet processing device according to claim 6, wherein the phase matching unit matches the phases upon receiving a sheet from a prior stage device when the stepping motor is stopped.

8. The sheet processing device according to claim 4, wherein the sheet processing device has a motion-disabled mode in which all motions are disabled, and the phase matching unit matches the phases when the motion-disabled mode is released.

9. The sheet processing device according to claim 4, further comprising:

a door for an access to an interior of the sheet processing device, wherein the phase matching unit matches the phases when the door is closed from an open state.

10. The sheet processing device according to claim 4, wherein the phase matching unit matches the phases at fixed time intervals when the sheet processing device is stopped.

11. The sheet processing device according to claim 4, wherein the phase matching unit matches the phases when there is no sheet remaining in the sheet processing device.

12. The sheet processing device according to claim 4, wherein the phase matching unit matches the phases when there is no abnormality in mechanisms of the sheet processing device.

13. An image processing apparatus comprising:

a sheet processing device including a stepping motor driving device that drives a stepping motor according to a drive pulse of a step signal, the stepping motor driving device including a phase matching unit that matches, at a time when there is a possibility that a rotor and a phase signal are out of phase with each other, phases of the rotor and the phase signal by applying at least one drive pulse after energizing the stepping motor for a predetermined time and applying a phase signal having a predetermined duration for a final pulse, wherein the stepping motor driving device further includes a phase signal restoring unit that drives, after the phase matching unit matches the phases, the stepping motor in a reverse driving direction for same number of drive pulses, and restores the phase signal to a state before the phase matching unit matches the phases.

* * * * *